US007338401B2

(12) United States Patent
Klemen et al.

(10) Patent No.: US 7,338,401 B2
(45) Date of Patent: Mar. 4, 2008

(54) TWO MODE ELECTRICALLY VARIABLE TRANSMISSION WITH EQUAL FORWARD AND REVERSE INPUT-SPLIT MODAL AND FIXED RATIO PERFORMANCE

(75) Inventors: Donald Klemen, Carmel, IN (US); Michael R. Schmidt, Carmel, IN (US); Brendan M. Conlon, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 11/187,525

(22) Filed: Jul. 22, 2005

(65) Prior Publication Data

US 2007/0021257 A1 Jan. 25, 2007

(51) Int. Cl.
*F16H 3/72* (2006.01)

(52) U.S. Cl. .......................... 475/5; 475/149; 903/911

(58) Field of Classification Search .................... None
See application file for complete search history.

(56) References Cited

U.S. PATENT DOCUMENTS

| | | | | |
|---|---|---|---|---|
| 5,931,757 | A | 8/1999 | Schmidt | 475/2 |
| 6,010,422 | A * | 1/2000 | Garnett et al. | 475/5 |
| 6,090,005 | A * | 7/2000 | Schmidt et al. | 475/5 |
| 6,527,658 | B2 | 3/2003 | Holmes et al. | 475/5 |
| 7,128,675 | B2 * | 10/2006 | Klemen et al. | 475/5 |
| 7,217,211 | B2 * | 5/2007 | Klemen et al. | 475/5 |
| 2007/0105679 | A1 * | 5/2007 | Tabata et al. | 475/5 |

* cited by examiner

*Primary Examiner*—Sherry Estremsky

(57) ABSTRACT

An electrically variable transmission includes a power source, three differential gear sets, first and second motor/generators each connected to at least one of the gear sets, and torque-transmitting mechanisms. An input member transfers power from the power source through the differential gear sets to an output member. The torque-transmitting mechanisms are selectively engageable to provide an input-split first electrically variable mode having equal forward and reverse speed ratios for given input speeds and to provide substantially equal fixed forward and reverse speed ratios.

20 Claims, 9 Drawing Sheets

| ENGINE CONNECTED | ENGAGED CLUTCHES | | | RATIO |
|---|---|---|---|---|
| FIXED REVERSE | 252 | 254 | 256 | -3.160 |
| EVT REVERSE | 252 | | 256 | -3.160 |
| EVT 1.1 | 250 | | 256 | 3.194 |
| FIXED F1 | 250 | 254 | 256 | 3.194 |
| EVT 1.2 | 250 | | 256 | 1.972 |
| SHIFT MODE I - MODE II | | | 256 | 1.528 |
| EVT 2.1 | 259 | | 256 | 1.244 |
| FIXED F2 | 259 | 254 | 256 | 1.00 |
| EVT 2.2 | 259 | | 256 | 0.76 |
| FIXED F3 | 259 | 258 | 256 | 0.76 |
| ENGINE DISCONNECTED | | | | |
| BATTERY REVERSE | 252 | | | -3.160 |
| UNIT A TO ENGINE | 258 | | | 2.612 |
| UNIT B FORWARD | 250 | | | 3.194 |

| ENGINE CONNECTED | ENGAGED CLUTCHES | | | RATIO |
|---|---|---|---|---|
| FIXED REVERSE | 452 | 454 | 456 | -3.160 |
| EVT REVERSE | 452 | | 456 | -3.160 |
| EVT 1.1 | 450 | | 456 | 2.926 |
| FIXED F1 | 450 | 454 | 456 | 2.926 |
| EVT 1.2 | 450 | | 456 | 1.806 |
| SHIFT MODE I - MODE II | | | 456 | 1.436 |
| EVT 2.1 | 459 | | 456 | 1.244 |
| FIXED F2 | 459 | 454 | 456 | 1.00 |
| EVT 2.2 | 459 | | 456 | 0.76 |
| FIXED F3 | 459 | 458 | 456 | 0.76 |
| ENGINE DISCONNECTED | | | | |
| BATTERY REVERSE | 452 | | | -3.160 |
| UNIT A TO ENGINE | 458 | | | 2.612 |
| UNIT B FORWARD | 450 | | | 2.926 |

| ENGINE CONNECTED | ENGAGED CLUTCHES | | | RATIO |
|---|---|---|---|---|
| FIXED REVERSE | 552 | 554 | 556 | -3.16 |
| EVT REVERSE | 552 | | 556 | -3.16 |
| EVT 1.1 | 550 | | 556 | 3.19 |
| FIXED F1 | 550 | 554 | 556 | 3.19 |
| EVT 1.2 | 550 | | 556 | 1.972 |
| SHIFT MODE I - MODE II | | | 556 | 1.528 |
| EVT 2.1 | 559 | | 556 | 1.244 |
| FIXED F2 | 559 | 554 | 556 | 1.00 |
| EVT 2.2 | 559 | | 556 | 0.76 |
| ENGINE DISCONNECTED | | | | |
| BATTERY REVERSE | 552 | | | -3.16 |
| UNIT A TO ENGINE | 558 | | | 2.612 |
| UNIT B FORWARD | 550 | | | 3.19 |

TWO MODE ELECTRICALLY VARIABLE TRANSMISSION WITH EQUAL FORWARD AND REVERSE INPUT-SPLIT MODAL AND FIXED RATIO PERFORMANCE

TECHNICAL FIELD

The present invention relates to electrically variable transmissions with selective operation both in power split variable speed ratio ranges and fixed speed ratios, having three planetary gear sets, two motor/generators and a plurality of torque-transmitting mechanisms to achieve equal forward and reverse performance.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999, to Michael R. Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input-split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention provides an electrically variable transmission offering several advantages over conventional automatic transmissions for use in hybrid vehicles, including improved vehicle acceleration performance, improved launch, and enhanced reverse power capability. An object of the invention is to provide the best possible energy efficiency and emissions for a given engine. In addition, optimal performance, capacity, package size, and ratio coverage for the transmission are sought.

The electrically variable transmission of the present invention provides first, second and third differential gear sets, two electric machines serving interchangeably as motors or generators, and a plurality of selectable torque-transmitting mechanisms. Preferably, the differential gear sets are planetary gear sets, but other gear arrangements may be implemented, such as bevel gears or differential gearing to an offset axis. The torque-transmitting mechanisms are selectively engageable to provide an input-split first electrically variable mode having equal forward and reverse speed ratios for given input speeds (i.e., at a given engine speed, a given first motor/generator speed and a given second motor/generator speed, the forward speed ratio is equal to the reverse speed ratio (although opposite in direction)). Substantially equal fixed forward and reverse speed ratios are also achievable.

In this description, the first, second and third planetary gear sets may be counted left to right or right to left.

Each of the planetary gear sets has three members. The first, second or third member of each planetary gear set can be any one of a sun gear member, ring gear member or a carrier member.

Each carrier member can be either a single-pinion carrier (simple) or a double-pinion carrier (compound).

An input member is continuously connected with a member of one of the gear sets, preferably with a first member of the first planetary gear set. The output member is continuously connected with another member of one of the gear sets, preferably with a member of the second or third planetary gear sets.

Preferably, an interconnecting member continuously connects a member of the second planetary gear set with a member of the third planetary gear set.

The first motor/generator is mounted to the transmission case (or ground) and is continuously connected to a member of the first planetary gear set, preferably the second member.

The second motor/generator is mounted to the transmission case and is continuously connected to a member of the third planetary gear set, preferably the third member.

The selectable torque transfer devices are engaged singly or in combinations of two or three to yield an EVT with a continuously variable range of speeds (including reverse) and up to six mechanically fixed forward speed ratios. A "fixed speed ratio" is an operating condition in which the mechanical power input to the transmission is transmitted mechanically to the output, and no power flow (i.e. almost zero) is necessary in the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators. A variety of fixed speed ratios and variable ratio spreads can be realized by suitably selecting the tooth ratios of the planetary gear sets.

Each embodiment of the electrically variable transmission disclosed has an architecture in which neither the transmission input nor output is directly connected to a motor/generator. This allows for a reduction in the size and cost of the electric motor/generators required to achieve the desired vehicle performance.

A first, second, third (and optional fourth and fifth) of the torque transfer mechanisms and the first and second motor/generators are operable to provide various operating states in the electrically variable transmission, including a battery reverse state, EVT reverse mode, fixed reverse and fixed forward launch states, continuously variable transmission range mode (including EVT forward launch), and fixed ratio states. The speed or torque ratios of the output member/input member or the applicable motor/generator to output member in EVT reverse, battery reverse, fixed reverse, fixed forward launch and EVT forward launch are substantially equivalent. The EVT forward launch mode is an input-split mode. A compound split, second electrically variable forward mode is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
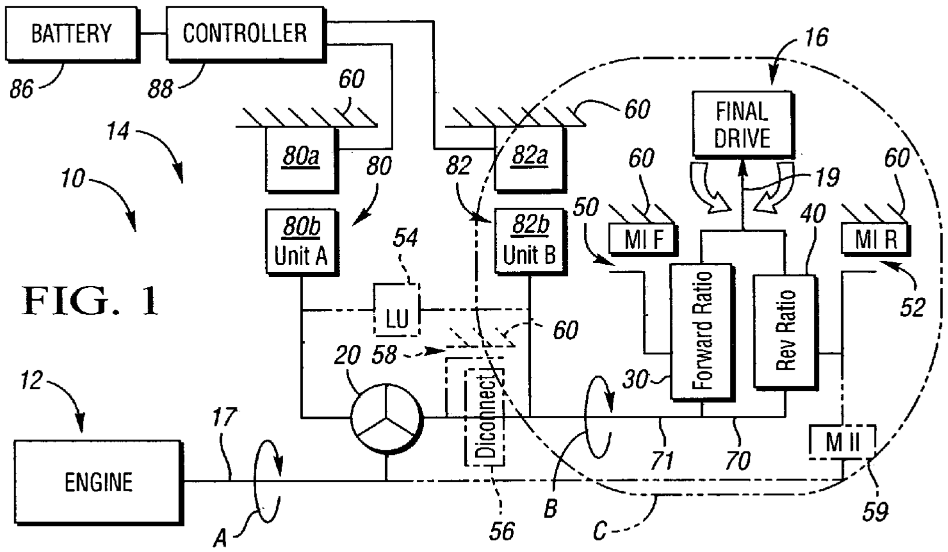
FIG. 1 is a schematic illustration of a powertrain including an electrically variable transmission of the present invention represented in part by a nodal diagram.

Referring to the drawings, wherein like reference numbers refer to like components, FIG. 1A shows the powertrain 10, including an engine 12 connected to one embodiment of an electrically variable transmission (EVT) designated generally by the numeral 14. The transmission 14 is designed to receive at least a portion of its driving power from the engine 12. The engine 12 has an output shaft that serves as the input member 17 of the transmission 14. A transient torque damper (not shown) may also be implemented between the engine 12 and the input member 17 of the transmission 14.

In the embodiment depicted, the engine 12 may be a fossil fuel engine, such as a diesel engine which is readily adapted to derive its available power output typically delivered at a constant number of resolutions per minute (RPM).

Irrespective of the means by which the engine 12 is connected to the transmission input member 17, the transmission input member 17 is operably connected to a first node 20. In the context of the present invention, a (node) is a junction of three of more power paths through which power is distributable between or among the power paths. For example, a (node) may receive power from a power path and distribute the power between or among two separate power paths. Similarly, a (node) may receive power from two power paths and transmit the power to a third power path.

In FIG. 1, the engine 12, as well as first and second motor generators 80, 82 (referred to as Unit A and Unit B, respectively) are connected or connectable to the first node 20. Examples of devices that may function as nodes include a planetary gear set with a sun gear member, ring gear member, and a planet carrier assembly member including a carrier member, a dual path clutch, a differential, a Ravigneaux gear set, etc. Power paths may include input shafts, output shafts, electric motor/generators, rotatable interconnecting members, etc. The present transmission 14 also includes a second node 30 illustrated in FIG. 1 schematically as a box labeled "forward ratio," as well as a third node 40 illustrated in FIG. 1 as a box labeled "reverse ratio." Within the scope of the present invention, the nodes 20, 30, 40 are preferably planetary gear sets. Accordingly, the remainder of the description may refer to the nodes as planetary gear sets.

In FIG. 1, certain components (discussed below) are shown in phantom and are relevant to various optional aspects of the invention. The basic transmission schematic incorporates those elements not shown in phantom and includes a connecting member 71 connected between the first and second nodes, 20, 30. The second motor/generator 82 also connects to the connecting member 71. An interconnecting member 70 is shown connecting the second node 30 with the third node 40.

Torque from the engine 12 rotates the input member 17 in a direction indicated by the arrow A. Unit B 82 may be controlled such that it rotates in the same direction as the engine 12. The first node 20, also referred to as the planetary gear set 20, is designed to ensure that the connecting member 71 between the first node 20 and the second node 30 rotates in the same direction as the direction of rotation of the input member 17. Accordingly, arrow B is shown rotating in the same direction as arrow A. Thus, the torque of the engine is additive to the torque of the second motor generator 82.

A torque transmitting mechanism such as a brake 50, shown schematically as MI F, is engageable to connect an element of the second node 30 with a stationary transmission housing 60 which, as discussed below, enables a forward ratio by causing an output member 19 to turn in a direction which propels the final drive 16 and a vehicle in a forward drive direction. Similarly, a torque-transmitting device such as a brake 52, shown schematically as MI R, is engageable to connect an element of the third node 40 with the transmission housing 60 to thereby cause the output member 19 to rotate in an opposite direction associated with a reverse direction of the final drive 16.

The first and second motor/generators 80 and 82, respectively, include respective stators 80*a*, 82*a* and rotors 80*b*, 82*b*. The stator 80*a* of the first motor/generator 80 is secured to the transmission housing 60. The rotor 80*b* of the first motor/generator 80 is secured to an element of the first node 20 as shown more specifically with respect to FIGS. 7-17 below. The stator 82*a* of the second motor/generator 82 is also secured to the transmission housing 60. The rotor 82*b* of the second motor/generator 82 is secured to a separate element of the node 20.

Because the second motor/generator 82 of the transmission 10 of FIG. 1 is controlled to always turn in the same direction as the engine 12 in Mode I forward or Mode I reverse, starting can occur in either forward or reverse range Mode I. Mode I forward is achieved by engaging Mode I forward (MI F) brake 50. Similarly, Mode I reverse is achieved by engaging MI R the brake 52. Because the first planetary gear set 20 is utilized in the same manner in both Mode I forward and Mode I reverse, any difference in torque performance between these two modes is determined by gear tooth counts of the gear sets 30 and 40. These tooth counts may be selected to result in equal forward and reverse torque performance, for given input speeds, as will be understood by those skilled in the art. The brakes 50, 52 may be shifted synchronously when the output member 19 is at zero speed (i.e., at idle). The brakes 50, 52 may be shifted synchronously when the output member 19 is at zero speed (i.e., at idle). This is possible because at zero output speed, Unit B is operating at zero RPM, as best shown and described with respect to the chart of FIG. 10 below. When Unit B is at zero RPM, all element speeds of the gear elements of planetary gear sets 30, 40 are at zero speed. The synchronous transition shift reduces idle speed frictional spin losses, since two of the three planetary gear sets 30, 40 are held at zero rotational speed at idle. This schematic also allows reduce hill holding electrical loads by application of both MI F 50 and MI R 52. This allows the engine power to be reduced during operation at zero output speed when high output loads (i.e., torque loads on the output member 19) are presented due to grades. Notably, if both brake 50 and brake 52 are simultaneously engaged, both planetary gear sets 30 and 40 will be held stationary by the transmission housing 60. Thus, if a vehicle is stopped on an incline, engaging both brakes 50 and 52 will allow the transmission housing 60 to provide reaction torque to prevent rolling movement when torque (due to gravity) is applied to the output member. Because neither motor/generator is used to perform this braking function, electrical loading is reduced. Furthermore, the output section ensures equal forward/reverse performance in “battery” state, first EVT mode, and first fixed state of operation.

Unit A/Unit B/Engine Lock-Up Clutch

In order to further provide superior acceleration and efficiency, a Unit A/Unit B/Engine Lock-Up Clutch 54 may be added to the transmission 14 as shown in FIG. 1. As discussed below with respect to, for instance FIGS. 9A, 12A, and 13A, the lock-up clutch may be engaged to lock together both Units A and B 80, 82, respectively, and the engine 12 for common rotation, allowing all three to function as drive sources to provide a combined torque to the connecting member 71. Thus, output speeds and torques provided in for given input speeds in both Mode I forward and reverse and the first fixed (mechanical) ratio will be equal. Accordingly, output torque is sufficient to launch in EVT Mode I (forward or reverse) or in the first fixed speed ratio Electric Mode/Engine Off Disconnect and Engine Start Brake The transmission 14 may also provide optional additional functions allowing engine start and vehicle drive using only energy provided by an energy storage device or electric power source 86 (rather than energy provided via the engine 12) such as a battery to propel one of the motor/generators 80, 82. Energy is transferred between the battery 86 and the motors/generators 80, 82 via a controller 88, as is understood by those skilled in the art. The electric power source 86 may be one or more batteries. Other electric power sources, such as fuel cell and ultra-capacitors, have the ability to provide, or store and dispense, electric power may be used in place of batteries without altering the concepts of the present invention. The ECU 88 is programmed to ensure that Unit B 82 rotates in a direction so that torque from Unit B 82 is added to torque from the engine 12 at the connecting member 71.

Figure 8:
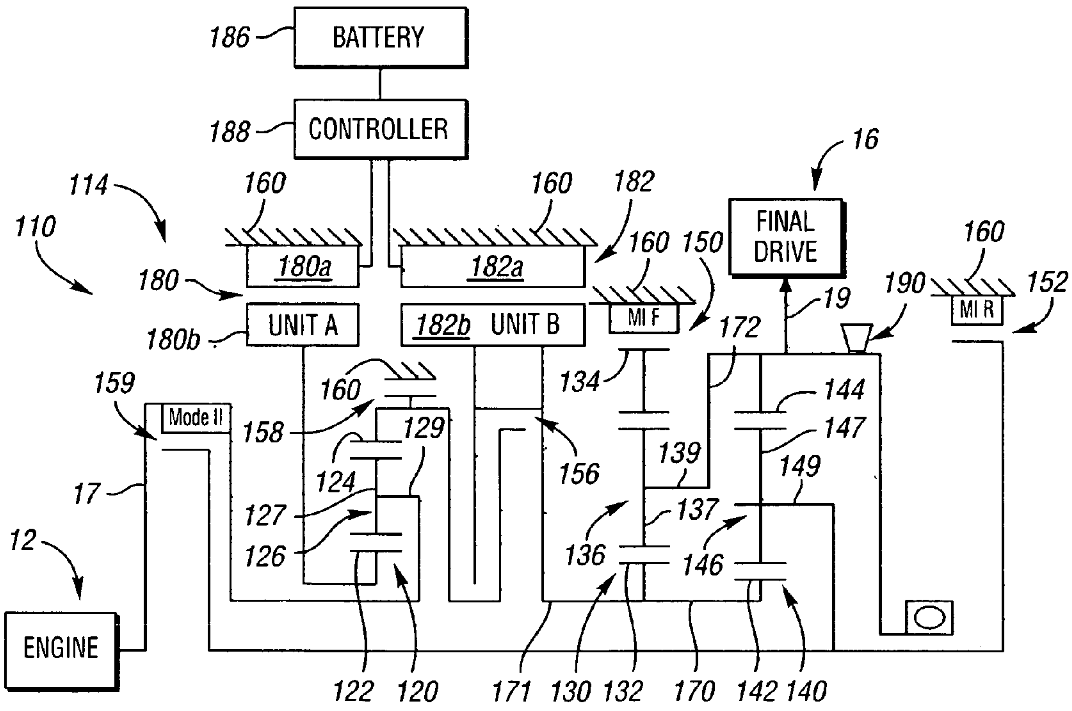
FIG. 8 is a schematic illustration of a first embodiment of a transmission constructed according to the nodal diagram of FIG. 1.

Notably, an electric start and an electric drive may be provided independently from one another to prevent unwanted vibration interactions. Specifically, a disconnect mechanism 56, which preferably is a torque-transmitting mechanism such as a clutch which acts to release a nodal connection of node 20, thereby resulting in disconnect of the engine 12 from the connecting member 71 when disengaged. When the torque transmitting member 56 is disengaged, Unit B 82 is available to provide torque to the connecting member 71 and through either the forward or reverse respective gear sets 30, 40 to the output member 19. An example of the disconnect torque-transmitting mechanism is provided by torque-transmitting mechanism 156 of FIG. 8 and described with respect thereto. Referring to FIG. 8, those skilled in the art will recognize that when torque-transmitting mechanism (disconnect mechanism) 156 is engaged, Unit B is connected with the ring gear member 124 of planetary gear set 120. Because the carrier member 129 is connected with the engine 12 and the sun gear member 122 is connected with Unit A, the planetary gear set 120 has all three gear members engaged, thus being active to provide engine torque through the planetary gear sets either 130 or 140 (depending on the selection of forward Mode I brake 150 or reverse Mode I brake 152) to provide torque to the final drive 16 through output member 19. However, when the disconnect torque-transmitting mechanism 156 is not engaged, planetary gear set 120 is not active and engine torque is disconnected from the output member 19. In that instance, Unit B is available to provide driving torque to the output member 19.

Referring again to FIG. 1, the transmission may be provided with a brake 58 which may be engaged to provide a mechanical fixed ratio connection between Unit A and the engine 12 to allow Unit A to act as a starter for the engine 12. The ability to provide an electric start via Unit A 80 with brake 58 applied ensures that maximum torque is provided to initiate starting and that minimum power is required, by eliminating secondary nodal power flows. This arrangement in FIG. 1 also provides three to four times Unit A torque to the input shaft of engine 12 to provide a very fast start. The brake 58 is engaged to start the engine 12 via Unit A in this manner when the disconnect torque-transmitting mechanism 56 is disengaged. Accordingly, the disconnect torque-transmitting mechanism 56 ensures that the electric drive of a vehicle via Unit B is independent of the electric start of the engine 12 via the Unit A. This results in a smooth start, with the lowest required starting energy as the inertial energy of planetary gear sets 130 and 140 are not in the mechanical path between Unit A and engine 12 during electric start of the engine 12 via Unit A 80 (i.e., only planetary gear set 120 is involved in this electric start).

The transmission 14 may be utilized for regenerative engine inertial recovery of shift energy. This is accomplished by programming the controller 88 such that Unit A 80 acts as a generator to capture engine rotational energy that is temporarily not utilized as clutch engagement is altered during shifts.

FIG. 1 shows in phantom a torque-transmitting mechanism 59 such as a clutch which is engageable to connect an element of node 20 with an element of the third node 40. The connection of node 20 to node 40 via the Mode II clutch 59 establishes a second electrically variable mode (Mode II). When the Mode II clutch 59 is engaged, the MI F brake 50 is synchronously disengaged, resulting in a compound, power split, electrically variable Mode II. Thus, by connecting the input differential (i.e., node or gear set 20) with the reverse ratio module (i.e., node 40), at the end of Mode I by engagement of the clutch Mode II 59, the second electrically variable mode is established and is used as the high efficiency means of achieving higher vehicle propulsion speeds and insuring low electrical power losses.

Output Configuration Block Diagrams

FIGS. 2-6 are schematic block diagrams representing the Mode II power flow arrangements and connections alternatives of planetaries 30 and 40. Specifically, FIGS. 2-6 represent alternative arrangements of these elements generally shown within the phantom circle C of FIG. 1, i.e., the connection of Unit B, planetary gear sets 30 and 40 and the Mode II clutch (referred to generally herein as the forward/reverse/Mode II section). In the block diagrams of FIGS. 2-6, the connection of Unit A and Unit B as well as the forward ratio node or gear set (i.e., gear set 20 of FIG. 1) are not shown. Those skilled in the art will recognize the commonalities of the block diagrams of FIGS. 2-6. Specifically, commonalities necessary for a dual mode, electrically variable transmission with equal forward/reverse create ability requires that the Mode II clutch be in series with engine input. Additionally, the reverse brake (BR in the block diagrams) must be connected to the output of the Mode II clutch and to one or two elemental nodes. Furthermore, the forward mode brake (represented by B1 in block diagrams) is connected to one or two nodes. The Unit B motor must be connected to one or two nodes. The forward mode brake (B1), the output, and the Unit B operate to independently connect to a node or nodes.

Figure 2:
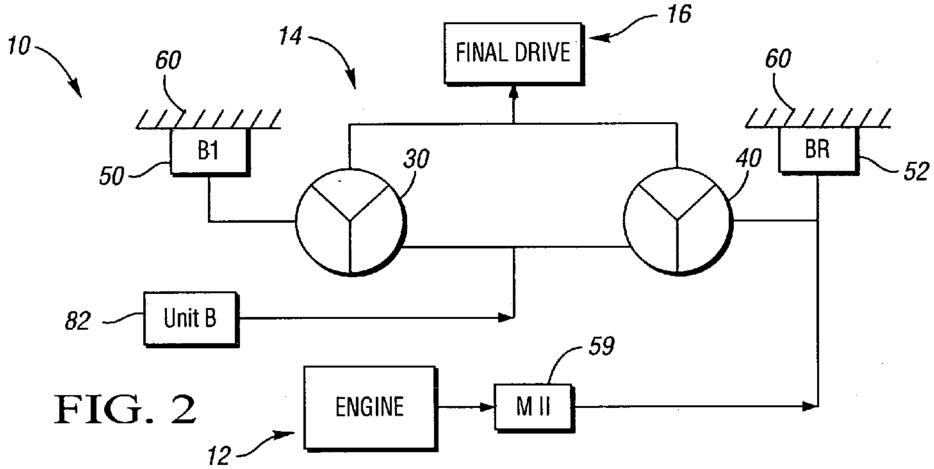
FIG. 2 is a schematic illustration of a nodal diagram representing a second electrically variable mode achievable by the transmission of FIG. 1.

Referring to FIG. 2, the output or final drive 16 is connected to two nodes 30 and 40. The Mode I selection brake 50 is connected to the single node 30. The reverse selection brake 52 is connected to two nodes 30 and 40. Unit B is connected to a single node 40.

Figure 3:
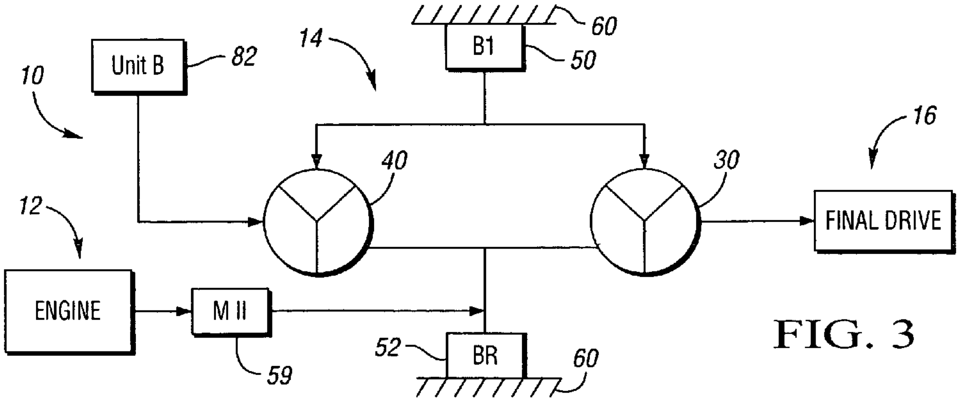
FIG. 3 is a schematic illustration of a nodal diagram representing an alternative arrangement of the components of the transmission of FIG. 1 to achieve a second electrically variable mode.

Referring to FIG. 3, the output or final drive 16 is connected to a single node 30. The Mode I selection brake 50 is connected to two nodes 30 and 40. The reverse selection brake 52 is connected to two nodes 30 and 40. Unit B is connected to a single node 40.

Figure 4:
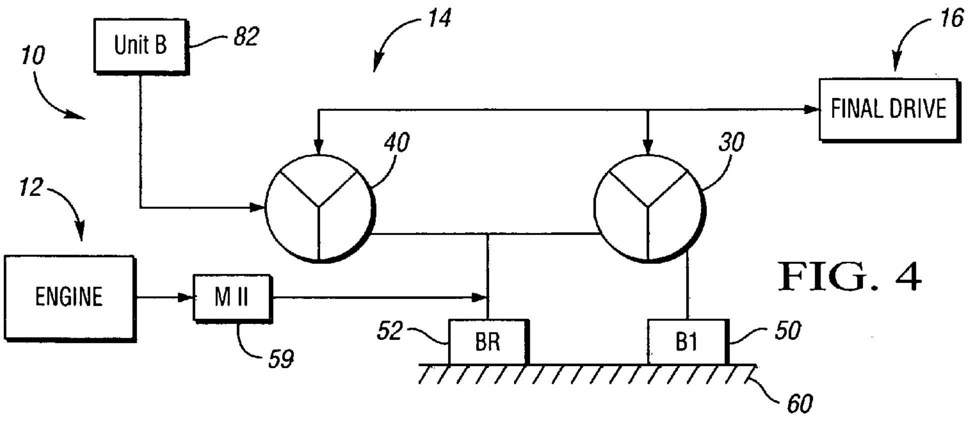
FIG. 4 is a schematic illustration of a nodal diagram representing yet another alternative arrangement of the components of the transmission of FIG. 1 to achieve a second electrically variable mode.

Referring to FIG. 4, the output or final drive 16 is connected to two nodes 30 and 40. The Mode I selection brake 50 is connected to a single node 30. The reverse selection brake 52 is connected to a single node 40. Unite B is connected to two nodes 30 and 40.

Figure 5:
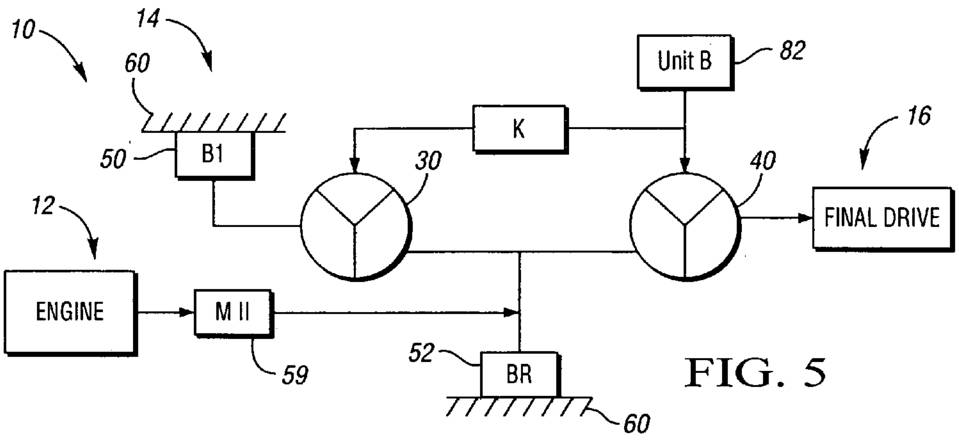
FIG. 5 is a schematic illustration of a nodal diagram representing still another alternative arrangement of the components of the transmission of FIG. 1 to achieve a second electrically variable mode.
Figure 6:
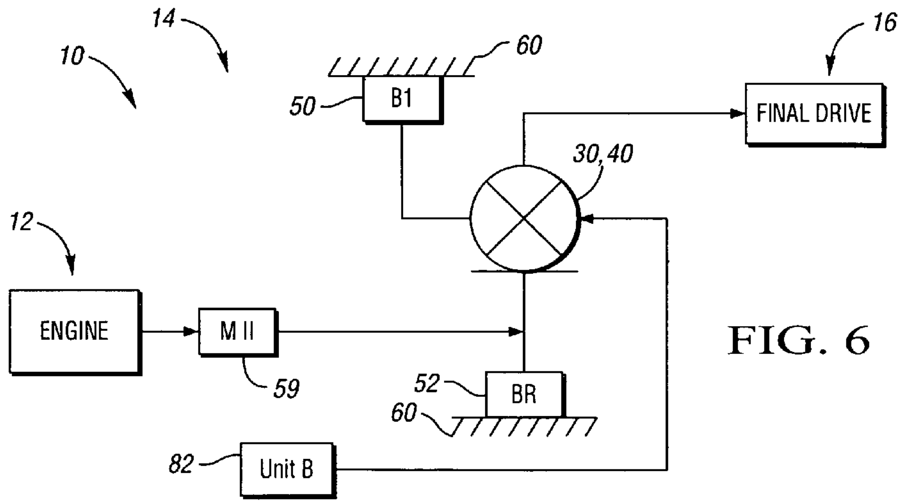
FIG. 6 is a schematic illustration of a nodal diagram representing yet another alternative arrangement of the components of the transmission of FIG. 1 to achieve a second electrically variable mode.

FIGS. 5 and 6 represent a special output option using internally-compounding gear set. In FIGS. 5 and 6, two nodes 30 and 40 are connected by a fixed ratio (denoted by "K" in FIG. 5). This may occur in such hardware as a Ravigneaux gear set as shown an described with respect to FIG. 12. The reverse selection brake 52 may be tied to carriers of both nodes 30 and 40, thereby making one assembly module resulting in a four input node 30,40 as shown schematically in FIG. 6. FIGS. 11-14 implement the internally-compounded output block diagram option.

Mechanical Schematic Mode II Compound Split Output Diagram

Figure 7:
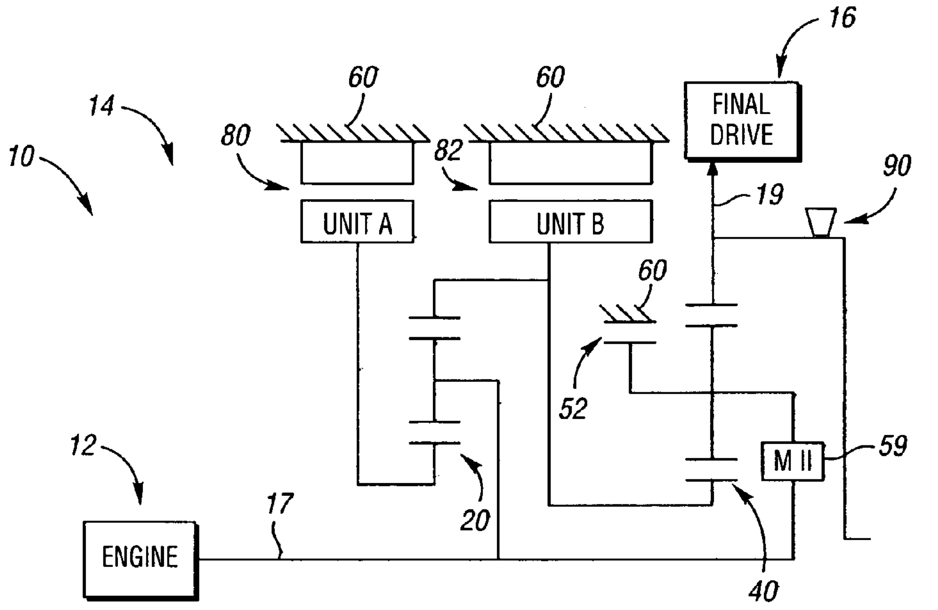
FIG. 7 is a schematic illustration of some of the components of the transmission of FIG. 1 arranged to achieve a second electrically variable mode.

FIG. 7 is a partial schematic diagram of desired planetary connections between the input node or planetary 20 and the reverse planetary module or node 40 during a second, electrically variable Mode II in which the torque-transmitting mechanism 59 is engaged. The planetary gear set or node 30 used in Mode I forward is not shown in this diagram. Because the MI R brake 52 of FIG. 1 is unused in Mode I forward operation of the transmission 14, it is unloaded and is therefore available for engagement for implementing the Mode II compound split architecture. Thus, when the torque-transmitting mechanisms 52 and 59 of FIG. 7 are engaged, the transmission 14 will operate in an electrically variable Mode II. Desired positioning of a parking mechanism 90 with respect to the output member 19 is also shown in FIG. 7.

First Schematic Embodiment

Referring to FIG. 8, a completed schematic preferred embodiment of a powertrain 110 having a transmission 114 is depicted. In the embodiments of FIGS. 8 through 16, like reference numbers are used to refer to like components of the node schematic block diagrams of FIGS. 1 through 6. The powertrain 110 includes a transmission 114 utilizing three differential gear sets, preferably in the nature of planetary gear sets 120, 130, 140. The planetary gear set 120 employs an outer gear member 124, typically designated as a ring gear member. The ring gear member 124 circumscribes an inner gear member 122, typically designated as a sun gear member. A planet carrier assembly member 126 includes a carrier member 129 that rotatably supports a plurality of planet gear members 127 such that each planet gear member 127 meshingly engages both the ring gear member 124 and the sun gear member 122 of the first planetary gear set 120. The input member 17 is secured to the carrier member 129 of the planetary gear set 120.

The planetary gear set 130 also has an outer gear member 134, also often designated as the ring gear member, which circumscribes an inner gear member 132, also often designated as the sun gear member. The plurality of planet gears 137 are also rotatably mounted on a carrier member 139 of a planet carrier assembly member 136 such that each planet gear member 137 simultaneously, and meshingly, engages both the ring gear member 134 and the sun gear member 132 of the planetary gear set 130.

The planetary gear set 140 also has an outer gear member 144, also often designated as the ring gear member, which circumscribes an inner gear member 142, also often designated as the sun gear member. The plurality of planet gear members 147 are also rotatably mounted on a carrier member 149 of a planet carrier assembly member 146 such that each planet gear member 147 simultaneously, and meshingly,:engages both the ring gear member 144 and the sun gear member 142 of the planetary gear set 140.

An inner connecting member 170 continuously connects the sun gear member 132 with the ring gear member 142. Additionally, inner connecting member 172 continuously interconnects the carrier member 139 with the ring gear member 144.

The transmission 114 also incorporates first and second motor/generators 180 and 182, respectively. Motor/generators 180, 182 are also referred to as Unit A and Unit B and operate as described with respect to FIGS. 1 through 7 similarly to Unit A and Unit B 80, 82. The stators 180*a*, 182*a* of the respective motor/generators 180, 182 are secured to the transmission housing 160. The rotor 180*b* of Unit A is secured to the sun gear member 122. The rotor 180*b* of Unit B is secured to the sun gear member 132 and to the sun gear member 142 via the interconnecting member 171. The planetary gear set 120 is designed (via gear tooth numbers and connection of the engine 12 to the planet carrier assembly member 126) so that connecting member 171 rotates in the same direction as the engine 12. The output member 19 is secured to the ring gear member 144 and to the carrier member 139 via the interconnecting member 172. Park brake mechanism 190 is shown in a position relative to output member 19.

The first torque-transmitting mechanism, such as Mode I forward (MI F) brake 150 is selectively engageable with the ring gear member 134. The second torque-transmitting mechanism such as the Mode I reverse (MI R) brake 152 selectively connects the carrier member 149 with the transmission housing 160. The third torque-transmitting mechanism such as disconnect clutch 156 selectively connects the second motor/generator 182 with the ring gear member 124. A fourth torque-transmitting mechanism such as a brake 158 selectively connects the ring gear member 124 with the transmission housing 160. Finally, a fifth torque-transmitting mechanism such as Mode II clutch 159 selectively connects the input member 17 with the carrier member 149. The torque-transmitting mechanisms 150, 152, 156, 158 and 159 are employed to assist in the selection of the operational modes of the hybrid transmission 114, as well be hereinafter more fully explained.

It is apparent from FIG. 8 in the foregoing description that the transmission 114 selectively receives power from the engine 12. The hybrid transmission 114 also receives power from an electrical power source 186, which is operably connected to a controller or ECU 188. The electric power source 186 may be one or more batteries. Other electric power sources, such as fuel cells, have the ability to provide, or store and dispense, electric power may be used in place of batteries without altering the concepts of the present invention. The output member 19 of the transmission 114 is in a location well suited for transverse arranged usage. This may apply to such vehicles as front wheel drive automobiles, or transmissions employing a drop box for all wheel drive. Thus, applications which stack engine and transmission systems behind a front axle may also utilize the transmission 114.

General Operating Considerations

One of the primary control devices is a well known drive range selector (not shown) that directs an electronic control unit (the controller or ECU 188) to configure the transmission for either the park, reverse, neutral, or forward drive range. The second and third primary control devices constitute an accelerator pedal (not shown) and a brake pedal (also not shown). The information obtained by the ECU 188 from these three primary control sources is designated as the "operator demand." The ECU 188 also obtains information from a plurality of sensors (input as well as output) as to the status of: the torque transfer devices (either applied or released); the engine output torque; the unified battery, or batteries, capacity level; and the temperatures of selected vehicular components. The ECU 188 determines what is required and then manipulates the selectively operated components of, or associated with, the transmission appropriately to respond to the operator demand.

The invention may use simple or compound planetary gear sets. In a simple planetary gear set a single set of planet gears are normally supported for rotation on a carrier member that is itself rotatable.

In a simple planetary gear set, when the sun gear is held stationary and power is applied to the ring gear of a simple planetary gear set, the planet gears rotate in response to the power applied to the ring gear and thus "walk" circumferentially about the fixed sun gear to effect rotation of the carrier member in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier member rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier member is restrained from spinning freely, and power is applied to either the sun gear or the ring gear, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier member and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the carrier member, and the ring gear are known, then the speed of the third member can be determined using a simple rule. The rotational speed of the carrier member is always proportional to the speeds of the sun and the ring, weighted by their respective numbers of teeth. For example, a ring gear may have twice as many teeth as the sun gear in the same set. The speed of the carrier member is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier member, and the ring gear can also be simply related to one another if this is done without consideration of the masses of the gears, the acceleration of the gears, or friction within the gear set, all of which have a relatively minor influence in a well designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier member must be equal in magnitude and opposite in direction to the sum of the torque on the sun gear and the torque on the ring gear.

In a compound planetary gear set, the utilization of inner and outer sets of planet gears effects an exchange in the roles of the ring gear and the carrier member in comparison to a simple planetary gear set. For instance, if the sun gear is held stationary, the carrier member will rotate in the same direction as the ring gear, but the carrier member with inner and outer sets of planet gears will travel faster than the ring gear, rather than slower.

In a compound planetary gear set having meshing inner and outer sets of planet gears the speed of the ring gear is proportional to the speeds of the sun gear and the carrier member, weighted by the number of teeth on the sun gear and the number of teeth filled by the planet gears, respectively. For example, the difference between the ring gear and the sun gear filled by the planet gears might be as many teeth as are on the sun gear in the same set. In that situation the speed of the ring gear would be the sum of two-thirds the speed of the carrier member and one third the speed of the sun. If the sun gear or the carrier member rotates in an opposite direction, the arithmetic sign is negative for that speed in mathematical calculations.

If the sun gear were to be held stationary, then a carrier member with inner and outer sets of planet gears will turn in the same direction as the rotating ring gear of that set. On the other hand, if the sun gear were to be held stationary and the carrier member were to be driven, then planet gears in the inner set that engage the sun gear roll, or "walk," along the sun gear, turning in the same direction that the carrier member is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier member. The effect of the rotation of the pinion gears in the outer set on their own axis and the greater effect of the orbital motion of the planet gears in the outer set due to the motion of the carrier member are combined, so the ring rotates in the same direction as the carrier member, but not as fast as the carrier member.

If the carrier member in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier member supporting a single set of planet gears will rotate with less speed and in the same direction as the sun gear. Thus, one can readily observe the exchange in roles between the carrier member and the ring gear that is caused by the use of inner and outer sets of planet gears which mesh with one another, in comparison with the usage of a single set of planet gears in a simple planetary gear set.

The normal action of an electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators 180, 182 gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, the battery 186 may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Specific Operating Considerations

Each of the embodiments described herein (FIGS. 8, 9A-B, 11-16) has many operating states. These operating states are described below and may be best understood by referring to respective operating state tables accompanying the transmission stick diagrams, such as the operating state tables of FIG. 9A, 12B and 13B.

A first operating state is the "battery reverse state" which corresponds with the Batt Rev row of each operating state table. In this state, the engine is off and the transmission element connected to the engine is not controlled by engine torque, though there may be some residual torque due to the rotational inertia of the engine. The EVT is driven by one of the motor/generators using energy from the battery, causing the vehicle to move in reverse. Depending on the kinematic configuration, the other/motor/generator may or may not rotate in this state, and may or may not transmit torque. If it does rotate, it is used to generate energy which is stored in the battery. In the embodiment of FIG. 8, in the battery reverse state, the brake 152 is engaged, the motor/generator 180 has zero torque, and the motor/generator 182 provides a reverse torque ratio through active gear set 140.

A second operating state is the "EVT reverse mode." In this state, the EVT is driven by the engine and by one of the motor/generators. The other motor/generator may operate in the motor or generator mode depending on the controller 188 command. This depends on the various inputs. Normally, without battery assist, the second unit functions as a generator and transfers 100% of the generated energy back to the driving motor. The net effect is to drive the vehicle in reverse, with a combined power from both the engine and energy storage systems available. Referring to FIG. 8, in the EVT reverse mode, the brake 152 and clutch 156 are engaged, with 156 engaged, gear set 20 is active and Unit A acts as a generator, Unit B powers the final drive 16 in an opposite (reverse) direction as input member 17.

Figures 9A, 9B:
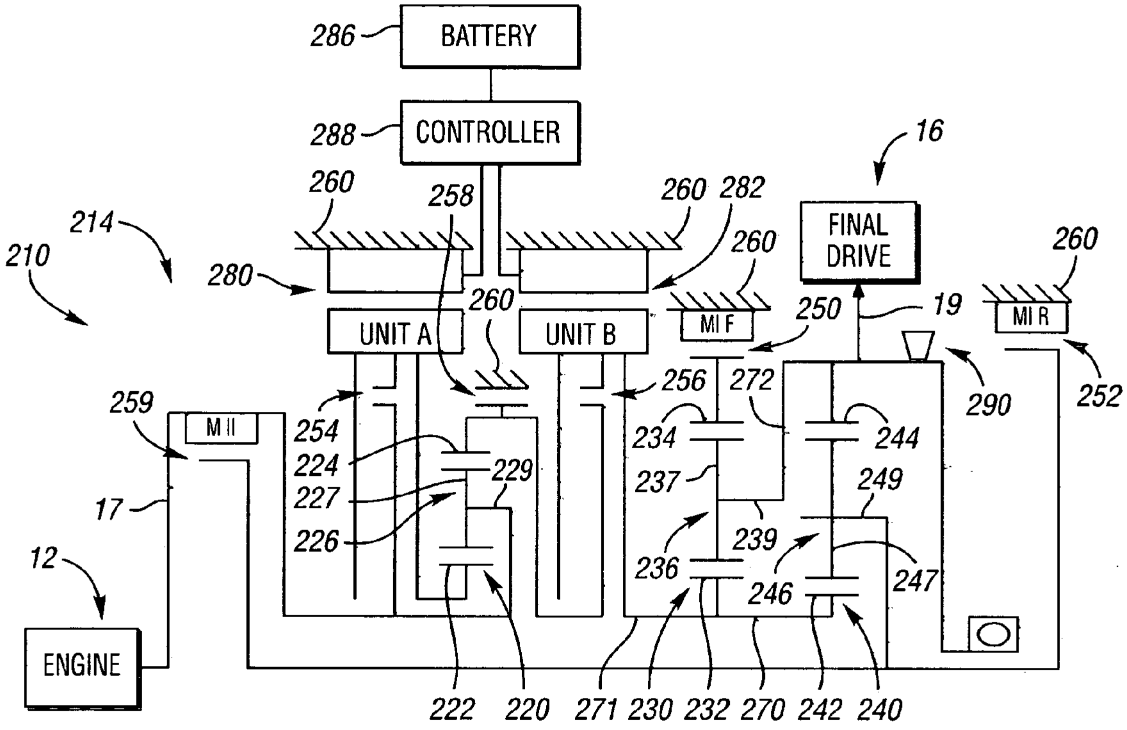
FIG. 9A is a schematic illustration of a second alternative embodiment of a transmission constructed according to the nodal diagram of FIG. 1.
FIG. 9B is an operating state table depicting some of the operating characteristics of the transmission of FIG. 9A.

A third operating state includes the "reverse and forward launch modes" (also referred to as "high torque reverse and forward modes") corresponding with the Fixed Reverse and Fixed F1 rows of each operating state table. In this state, the transmission is driven by the engine and selectably one or both of the motor/generators. A selectable fraction of the energy may be generated in the generator unit and stored in the battery, with the remaining energy being transferred to the motor. Referring to FIG. 9A, in the reverse and forward launch modes, clutches 254, 256 and either 250 or 252 (depending on whether forward or reverse launch is desired) are engaged.

Figures 12A, 12B:
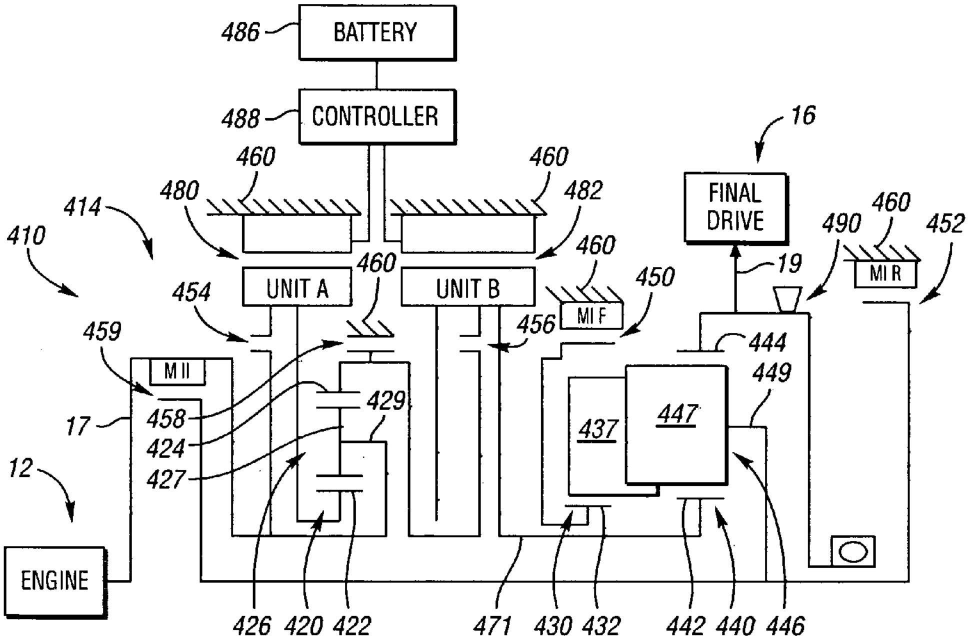
FIG. 12A is a schematic illustration of a fourth embodiment of a transmission, with the first planetary, Unit A, and Unit B constructed according to the nodal diagram of FIG. 1 , and the forward/reversing/Mode II section constructed per alternative nodal diagram version of FIG. 5.
FIG. 12B is an operating state table depicting some of the operating characteristics of the transmission of FIG. 12A.
Figures 13A, 13B:
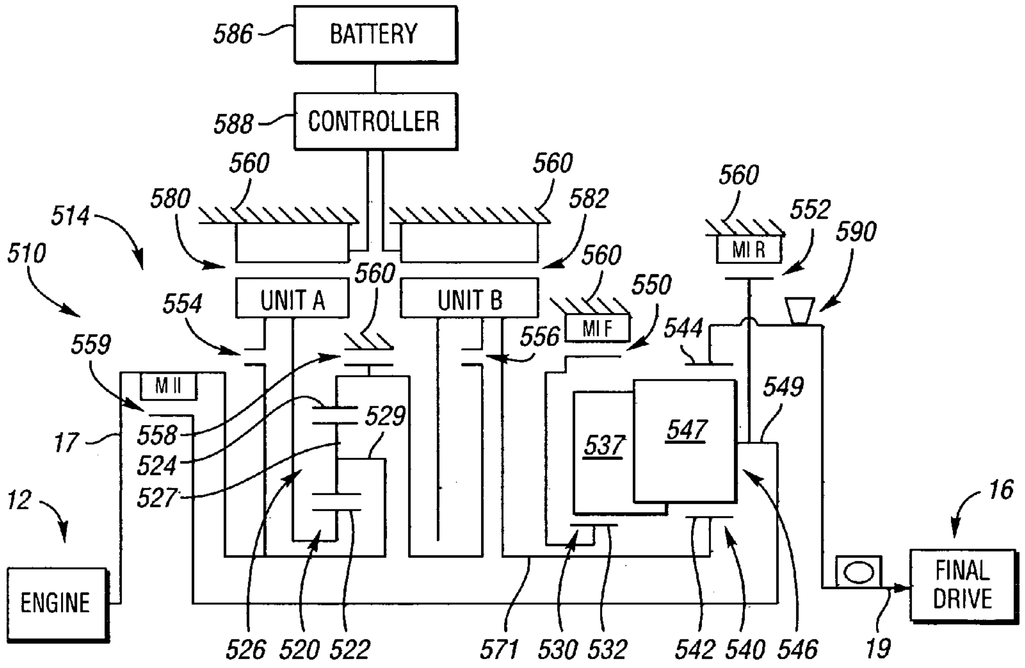
FIG. 13A is a schematic illustration of a fifth embodiment of a transmission, with the first planetary, Unit A, and Unit B constructed according to the nodal diagram of FIG. 1, and the forward/reverse/Mode II section constructed according to the alternative nodal diagram of FIG. 5.
FIG. 13B is an operating state table and depicting some of the operating characteristics of the transmission of FIG. 13A.

A fourth operating state is a "continuously variable transmission range mode" which includes the EVT 1.1, EVT 1.2, EVT 2.1, and EVT 2.2 operating points corresponding with rows of the operating point table, such as that of FIGS. 9B, 12B and 13B. In this mode, the EVT is driven by the engine as well as one of the motor/generators operating as a motor. The other motor/generator operates as a generator and transfers 100% of the generated energy back to the motor. The operating points represented by the EVT forward modes are discrete points in the continuum of forward speed ratios provided by the EVT. In these modes, the input to output speed ratio is controlled by speed control of units A and B, and results in infinitely variable within operation limits of the motor/generators.

Figure 10:
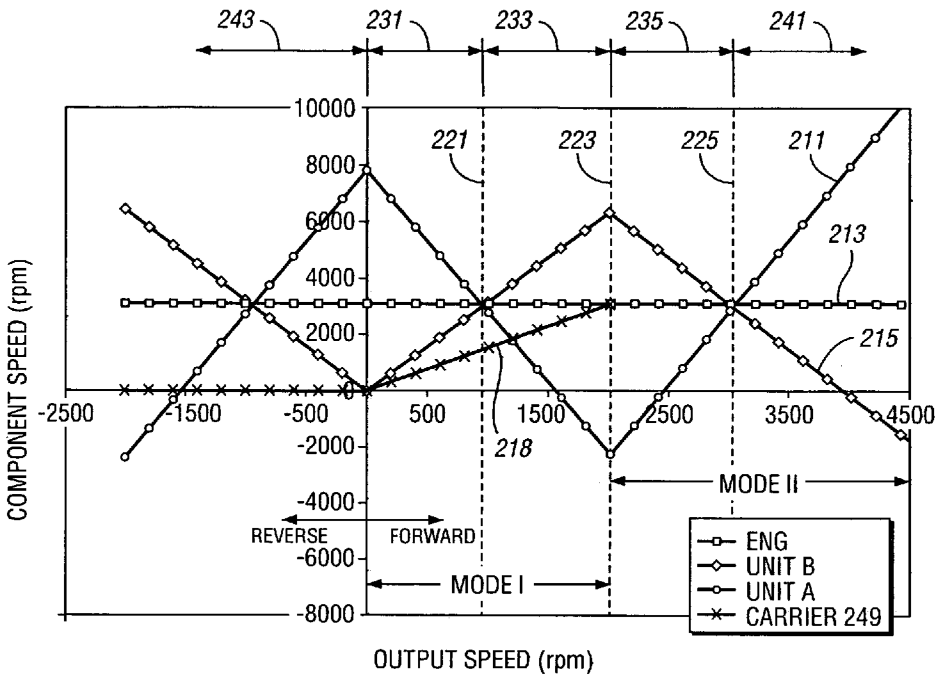
FIG. 10 is a chart of component speeds versus output speed of various components of the transmission of FIG. 9A.

A fifth operating state includes the "fixed ratio" states Fixed Rev1, Fixed F1, Fixed Shift ratio, Fixed F2, Fixed F3 as shown in the operating state tables of FIGS. 9A, 12B and 13B. In these states, the transmission operates like a conventional automatic transmission, with three torque transfer devices engaged to create a discrete transmission ratio. The clutching table accompanying each figure shows only some of the fixed-ratio forward speeds that are available. Additional fixed ratios may exist, should the brakes on Unit A or Unit B be applied. (A brake on Unit A is not shown.) Referring to FIG. 10, the opportunity to engage a clutch or brake exists whenever two component speeds intersect, or cross the zero component speed X-axis. For Instance, as Unit A crosses zero speed, a brake (not shown) could be synchronously applied locking Unit A rotation and resulting in a fixed input to output speed ratio. Clutching occurs as two rotating elements reach the same speed. In FIG. 10 for example, Unit A, Unit B and the Engine all have the same speed at an output speed at 221. This provides the opportunity to synchronously clutch these elements, which is precisely the function of clutch 254 in FIG. 9A. The chart in FIG. 10 shows up to six forward, and two reverse fixed ratio opportunities defined by component intersections with one another or with the zero component speed X axis. Modification of FIG. 8 to FIG. 9A, illustrates how the addition of a clutch 254 has been added to take advantage of such an opportunity shift. Selection of Mode I or II operation and the range within the selected Mode (i.e., EVT 1.1 or 1.2 or 2.1 or 2.2), is performed by the controller 288, and depends on the various inputs and design algorithms. These fixed ratios may be added for improved efficiency, higher accelerations, or usage in high average power cycles.

The transmission 14 is capable of operating in so-called single or dual modes. In single mode, the engaged torque transfer device remains the same for the entire continuum of forward speed ratios (represented by the discrete points: EVT 1.1, EVT 1.2). In dual mode, the engaged torque transfer device is switched at some intermediate speed ratio (e.g., EVT 2.1 in FIG. 12B). Depending on the mechanical configuration, this change in torque transfer device engagement has advantages in reducing element speeds in the transmission, improving efficiency, and, reducing electrical loading.

With the schematic embodiments disclosed herein, it is possible to synchronize clutch element slip speeds such that shifts are achievable with minimal torque disturbance (so-called "cold" shifts). For example, the transmissions of FIGS. 9A, 12A and 13A have cold shifts between ranges 1.2 and 2.1. In FIG. 10, the carrier member 249 speed intersects the engine speed at an output speed at 223. At this condition, a clutching mechanism can be synchronously applied. This mechanism, MII clutch 259 of FIG. 9, has no energy loss and therefore no temperature rise, resulting in the term "cold" shift.

Referring again to FIG. 8, the gear tooth ratios of the planetary gear sets 120, 130 and 140 of the transmission 114 of FIG. 8 may be varied as desired to obtain desired speed ratios. The transmission 114 may be modified to obtain at least six forward speed ratios as well as two fixed reverse ratios, an electrically variable forward and reverse, and a battery forward and reverse speed ratio. By way of example, assuming the tooth ratio of the planetary gear set 120 (i.e., the $N_{R1}/S_{R1}$) is 1.612, the $N_{R2}/S_{R2}$ value of the planetary gear set 130 is 2.194 and the $N_{R3}/S_{R3}$ value of the planetary gear set 140 is 3.16, then an electrically variable reverse driven into a reverse torque multiplication ratio of −3.160 defined by nodes 30 and 40 may be obtained by engaging clutches 152 and 156. Likewise, a substantially identical forward electrically variable speed ratio driven into a torque ratio of 3.1944 defined by nodes 30 and 40 may be obtained by engaging clutches 150 and 156. The first electrically variable speed ratio is obtained in Mode I, and is a first input-split variable launch mode of operation. The clutch 259 may be simultaneously engaged as clutch 250 is disengaged in order to obtain a compound split Mode II mode of operation with higher speeds and efficiencies. When clutch 158 is engaged and clutch 156 disengaged, Unit A is available for starting the engine independent of propulsion being performed by Unit B. Additionally, when clutches 156, 158 and 159 are engaged, a high efficiency mechanical fixed cruise state of operation is achieved. The battery reverse mode, the engine start state using power from Unit A as well as an electric battery forward speed ratio powered by Unit B are available when the clutch 156 is disengaged from Unit B. A more detailed example of the variety of speed ratios available with embodiments of the invention is provided in the truth tables of FIGS. 9B, 12B and 13B relating to the respective transmissions of FIGS. 9A, 12A and 13A. Those skilled in the art will readily understand the variety of ratios achievable with other embodiments such as that of FIG. 8 based upon the description of the embodiments of FIGS. 9A, 12A and 13A.

Second Schematic Embodiment

Referring to FIG. 9A, a second completed schematic preferred embodiment of a powertrain 210 having a transmission 214 is depicted. The transmission 114 utilizes three differential gear sets, preferably in the nature of planetary gear sets 220, 230 and 240. The planetary gear set 220 employs a ring gear member 224 which circumscribes a sun gear member 222. A planet carrier assembly member 226 includes a carrier member 229 that rotatably supports the plurality of planet gears 227 such that each planet gear 227 meshingly engages both the ring gear member 224 and the sun gear member 222. The input member 17 is secured to the carrier member 229.

The planetary gear set 230 has a ring gear member 234 which circumscribes a sun gear member 232. The plurality of planet gears 237 are rotatably mounted on a carrier member 239 of a planet carrier assembly member 236 such that each planet gear member 237 simultaneously and meshingly engages both the ring gear member 234 and the sun gear member 232.

The planetary gear set 240 also has a ring gear member 244 which circumscribes a sun gear member 242. A plurality of planet gears 247 are rotatably mounted on a carrier member 249 of a planet carrier assembly member 246 such that each simultaneously and meshingly engages both the ring gear member 244 and the sun gear member 242.

An interconnecting member 270 continuously connects the sun gear members 232 and 242. Additionally, an interconnecting member 272 continuously interconnects the planet carrier assembly member 236 with the ring gear member 244.

The transmission 214 also incorporates first and second motor/generators 280 and 282, respectively having stators secured to transmission housing 260. The rotor of the Unit A is secured to the sun gear member 222. The rotor of Unit B is secured to the sun gear member 232, and thereby to the sun gear member 242 through the connecting member 270. Park brake mechanism 290 is shown in the position relative to the output member 19.

The first torque-transmitting mechanism, such as forward mode brake MI F 250 is selectively engageable with the ring gear member 234 to ground the ring gear member 234 to the transmission housing 260. A second torque-transmitting mechanism such as reverse brake MI R 252 selectively connects the planet carrier assembly member 246 with the transmission housing 260. A third torque-transmitting mechanism 254 selectively connects the rotor of Unit A to the carrier member 229 as well as to the engine 12. A fourth torque-transmitting mechanism 256 selectively connects the rotor of Unit B to the ring gear member 224. A fifth torque-transmitting mechanism 258, such as a brake, selectively connects the ring gear member 224 with the transmission housing 260. Finally, a sixth torque-transmitting mechanism, such as a clutch 259, selectively connects the engine 12 with the carrier member 249. The clutch 259 is referred to as the Mode II clutch.

It is apparent from FIG. 9A that the transmission 214 selectively receives power from the engine 12. The hybrid transmission 214 also receives power from an electrical power source 286, which is operably connected to a controller 288. With the engagement of the clutch 254 (which functions the same as the lock-up clutch 54 described with respect to FIG. 1), the planetary gear set 220 is locked as the motor/generator 280 is connected to both the sun gear member 222 and the carrier member 229. As those skilled in art will readily understand, locking the planetary gear set 220 locks the rotation of the motor/generators 280, 282 and the engine 12 to allow all three sources to function as drive sources for optimal acceleration performance, high constant low speed efficiency, or higher regenerative braking. With clutch 254 applied, the engine torque, and unit torques are independent, and controlled as programmed into the controller 288.

The engagement schedule for the torque-transfer mechanisms of FIG. 9A is shown in the operating mode table and fixed ratio mode table of FIG. 9B. FIG. 9B also provides an example of torque ratios that are available utilizing the following gear tooth counts: 49 for sun gear 222, 15 for planet gear 227, 79 for ring gear 224, 36 for sun gear member 232, 19 for planet gear 237, 25 for ring gear 242, 27 for planet gears 247 and 79 for each of the ring gears 234, 244. Also, the ratio steps that are attained utilizing the sample of tooth numbers given may be calculated by dividing a forward ratio by another subsequent forward ratio. For example, the step ratio between first forward electrically variable mode EVT 1.1 and the second electrically variable mode EVT 1.2 is 1.99.

In the truth table of FIG. 9B, numerous forward and reverse states are grouped as "engine connected" states and may be so described due to the engagement of clutch 256. When clutch 256 is connected, power may flow from the engine 12 to the output shaft 19. FIG. 9B also shows "engine disconnected" states which includes ratios achievable when the clutch 256 is disengaged, such that power does not flow from the engine 12 to the output shaft 19.

The truth table of FIG. 9B indicates that an identical reverse speed ratio of −3.160 may be achieved three different ways: via a fixed ratio, an electrically variable ratio (for given input speeds) or an engine disconnected "battery reverse" ratio. The fixed reverse ratio is achieved by the engagement of clutches 254 and 256 as well as brake 252. With the engagement of clutch 254, gear set 220 is inactive because motor/generator 280 is connected to both the sun gear member 222 and the carrier member 229. At zero output speed, the speed of Unit B is zero (as noted in the representative speed diagram of FIG. 10). Thus, engine torque flows through the third gear set 240 to achieve a reverse fixed ratio of −3.160.

The electrically variable reverse ratio (EVT Reverse) is achieved with the engagement of the MI R brake 252 and the clutch 256. This allows additive torque from the engine 12 and Unit B to power the sun gear member 242. The planet gear 247 is held stationary by brake 252 and the output ratio is provided at the ring gear member 244.

The battery reverse ratio of −3.160 is achieved by engagement of the clutch 252. Because clutch 256 is not engaged, the engine 12 is disconnected and the reverse output ratio is achieved by power from the motor/generator 282 (Unit B) flowing through active gear set 240 to the output member 19.

Notably, the transmission 214 of FIG. 9A also achieves equal forward launch ratios of 3.194 in an electrically variable EVT mode 1.1 (at discrete, given input speeds), in a fixed ratio forward ratio FI and in an electric ratio powered by Unit B. These ratios are achieved by engagement of various clutches as shown in FIG. 9B. The forward ratios EVT 1.1, Fixed FI and Unit B Forward are substantially equivalent to the fixed reverse, EVT reverse (at the same discrete, given input speeds as the EVT 1.1 ratio)and battery reverse ratios. Thus, the transmission 214 of FIG. 9A achieves an input-split forward launch mode with a substantially equivalent ratio at any given input speeds as an EVT reverse mode, with substantially equivalent forward and reverse fixed ratios, and with substantially equivalent forward and reverse engine disconnected ratios.

FIG. 10 is a graphical depiction of the speeds of various transmission components with respect to the speed of the output shaft in an exemplary operation of transmission 214.

Referring to FIGS. 9A and 10, the speed of the engine 12 (and input shaft 17) is depicted by line 213, the speed of motor/generator 280 is depicted by line 211, the speed of motor/generator 282 is depicted by line 215, and the speed of carrier member 249 is depicted by line 218. In a first forward range or mode 231 of EVT operation, i.e., prior to output shaft speed 221, clutches 250 and 256 are engaged. Gear set 220 operates in a differential mode, and gear set 230 operates in a torque multiplication mode. Input shaft speed 213, and correspondingly the speed of the engine, is substantially constant throughout the operation of the transmission to simplify description. The controller 288 causes the speed of the first motor/generator 280 to start at about 8000 rpm and decrease with increasing output shaft speed. Simultaneously, the speed of the electric machine 282 starts at zero and increases with increasing output shaft speed. The speed of carrier member 249 rises proportionally with the output shaft speed. As is apparent from the chart of FIG. 10, the motor/generator speeds are equal (although opposite in direction) in the forward mode 231 and a reverse mode 243, as selected by engaging either clutch 250 (for forward) as clutch 252 (for reverse) while clutch 256 remains engaged.

At output shaft speed 221, the speed of motor/generator 282 (Unit B) surpasses that of the engine 12 which the speed of motor/generator 280 (Unit A) falls below that of the engine 12. The speed ranges denoted by 231 and 233 together constitute a Mode I forward range of operation. At an output speed near 1500 rpm, the speed of motor/generator 280 is zero. At output shaft speed 223, the transmission is shifted from the first EVT range or Mode I (including speed ranges 231, 233), to a second EVT range or Mode II 235, 241. At such point, the speeds of engine 12 and carrier member 249 are substantially equal due to the engagement of clutches 250 and 256, so that clutch 259 is engaged (and clutch 250 disengaged) with essentially no resulting torque disturbance to shift from the first electrically variable mode (Mode I) to the second electrically variable mode (Mode II). In Mode II, the speed of motor/generator 280 continues to increase with increasing output shaft speed, and the speed of motor/generator 282 decreases with increasing output shaft speed.

The transmission 214 is also characterized by a Mode I reverse range 243. At zero output speed, the clutches 252 and 256 may be engaged. The ratio of the active planetary gear sets 220 and 240 are such that a negative ratio is achieved by planetary 240 is nearly equal to that achieved in forward by planetary 230. Thus, the EVT path may be operated precisely as it is in the Mode I forward range, thereby providing equal reverse. A mechanical (fixed) reverse ratio equal to the ring gear/sun gear tooth ratio of the planetary gear set 240 is achieved by engaging clutches 252, 254 and 256. Selection of electrically variable mode operation or fixed ratio operation again is determined by the controller 288.

Third Schematic Embodiment

Figure 11:
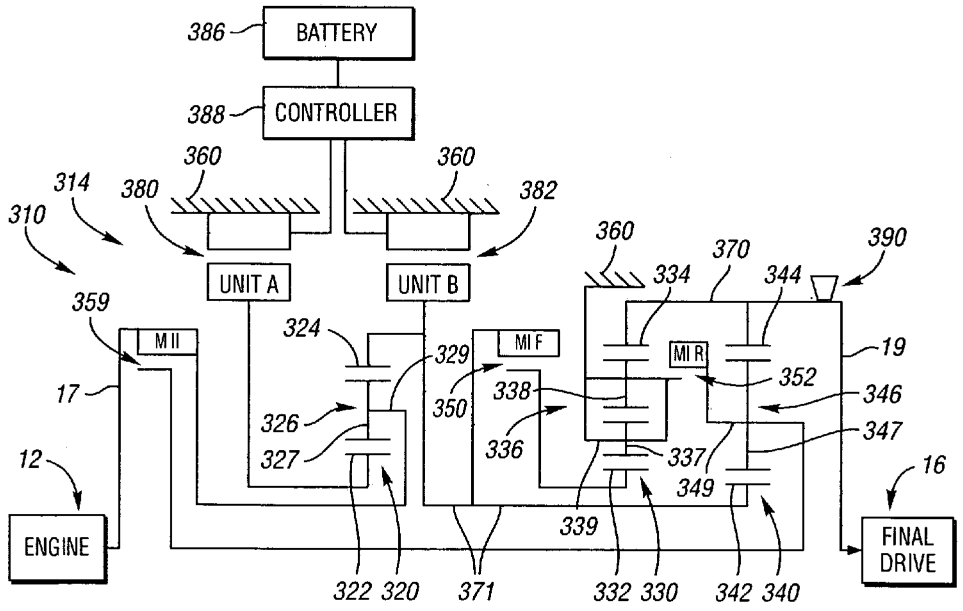
FIG. 11 is a schematic illustration of a third embodiment of a transmission constructed according to the nodal diagram of FIG. 1, with clutching mechanisms located in alternate locations.

Referring to FIG. 11, a third completed schematic preferred embodiment of a powertrain 310 having a transmission 314 is depicted. The transmission 314 utilizes three differential gear sets, preferably in the nature of planetary gear sets 320, 330 and 340. The planetary gear set 320 employs a ring gear member 324 which circumscribes a sun gear member 322. A planet carrier assembly member 326 includes a carrier member 329 that rotatably supports the plurality of planet gears 327 such that each planet gear 327 meshingly engages both the ring gear member 324 and the sun gear member 322. The input member 17 is secured to the carrier member 329.

The planetary gear set 330 has a ring gear member 334 which circumscribes a sun gear member 332. The plurality of planet gears 337 are rotatably mounted on a carrier member 339 of a planet carrier assembly member 336 such that each planet gear member 337 simultaneously and meshingly engages both the ring gear member 334 and the sun gear member 332.

The planetary gear set 340 also has a ring gear member 344 which circumscribes a sun gear member 342. A plurality of planet gears 347 are rotatably mounted on a carrier member 349 of a planet carrier assembly member 346 such that each simultaneously and meshingly engages both the ring gear member 344 and the sun gear member 342.

An interconnecting member 370 continuously connects the ring gear members 334 and 344. Additionally, an interconnecting member 372 continuously interconnects the ring gear member 324 with the sun gear member 342. The carrier member 339 is grounded to the transmission housing 360.

The transmission 314 also incorporates first and second motor/generators 380 (Unit A) and 382 (Unit B), respectively. The rotor of Unit A is secured to the sun gear member 322. The rotor of Unit B is secured to the ring gear member 324, and thereby to the sun gear member 342 through the interconnecting member 372. Park brake mechanism 390 is shown in a position relative to the output member 19.

A first torque-transmitting mechanism, such as forward Mode I clutch MI F 350 is selectively engageable with the sun gear member 332 to connect the sun gear member 332 with ring gear member 324 and the sun gear member 342. A second torque-transmitting mechanism such as reverse brake MI R 352 selectively connects the carrier members 339 and 349. A third torque-transmitting mechanism, such as a clutch 359, selectively connects the engine 12 with the planet carrier 349. The clutch 359 is referred to as the Mode II clutch and establishes a second forward electrically variable drive mode.

It is apparent from FIG. 11 that the transmission 314 selectively receives power from the engine 12. The hybrid transmission 314 also receives power from an electrical power source 386, which is operably connected to a controller 388. Optional torque-transmitting mechanisms may be added for engine start by Unit A, lockup mechanism (to lock Unit A, Unit B and the engine 12 to one another for improved acceleration, and for disconnect between Units A and B, as described above with respect to the node diagram of FIG. 1 and the schematic embodiments of FIGS. 8 and 9A.

Fourth Schematic Embodiment

Referring to FIG. 12A, a fourth preferred embodiment of a powertrain 410 having a transmission 414 is depicted. The transmission 414 utilizes three differential gear sets, preferably in the nature of planetary gear sets 420, 430 and 440. The planetary gear set 420 employs a ring gear member 424 which circumscribes a sun gear member 422. A planet carrier assembly member 426 includes a carrier member 429 that rotatably supports a plurality of planet gears 427 such that each planet gear 427 meshingly engages both the ring gear member 424 and the sun gear member 422. The input member 17 is secured to the carrier member 429.

The planetary gear sets 430 and 440 are "compounded" to one another via continuously connected planet gears 437, 447 of each respective gear set, and share a common carrier.

The planetary gear set 430 also has a sun gear member 432 meshingly engaged with each planet gear 437. The planetary gear set 440 also has a ring gear member 444 which circumscribes a sun gear member 442. The plurality of planet gears 447 are rotatably mounted on a carrier member 449 of planet carrier assembly member 446 such that each simultaneously and meshingly engages both the ring gear member 444 and the sun gear member 442. This type of compounded planetary 430, 440 is known to those skilled in the art as a Ravigneaux gear set. The compounded gear set 430, 440 provides sufficient "degrees of freedom" to enable a synchronous shift from the forward Mode I brake 450 to the reverse MI R brake 452, as described below with respect to the truth table of FIG. 12B.

The transmission 414 also incorporates first and second motor/generators 480 and 482, respectively, which may be respectively referred to as Unit A and Unit B. The rotor of Unit A 480 is secured to the sun gear member 422. The rotor of Unit B 482 is secured to the sun gear member 442 via connecting member 471. The planetary gear set 420 is designed (via gear tooth numbers and connection of the engine 12 to the planet carrier member 429) so that connecting member 471 rotates in the same direction as the engine 12. The output member 19 is secured to the ring gear member 444. Park brake mechanism 490 is shown in a desired position relative to output member 19.

The first torque-transmitting mechanism, such as Mode I forward (MI F) brake 450 selectively connects the sun gear member 432 with the transmission housing 460. The second torque-transmitting mechanism such as the Mode I reverse (MI R) brake 452 selectively connects the carrier member 449 with the transmission housing 460. The third torque-transmitting mechanism such as disconnect clutch 456 selectively connects the second motor/generator 482 with the ring gear member 424. A fourth torque-transmitting mechanism such as a brake 458 selectively connects the ring gear member 424 with the transmission housing 460. Finally, a fifth torque-transmitting mechanism such as Mode II clutch 459 selectively connects the input member 17 with the carrier member 449. The torque-transmitting mechanisms 450, 452,456, 458 and 459 are employed to assist in the selection of the operational modes of the hybrid transmission 414, as will be hereinafter more fully explained.

It is apparent from FIG. 12A and the foregoing description that the transmission 414 selectively receives power from the engine 12. The hybrid transmission 414 also receives power from an electrical power source 486, which is operably connected to a controller or ECU 488. The electric power source 486 may be one or more batteries. Other electric power sources, such as fuel cells, have the ability to provide, or store and dispense, electric power may be used in place of batteries without altering the concepts of the present invention.

As set forth above, the engagement schedule for the torque-transfer mechanisms is shown in the operating mode table and fixed ratio mode table of FIG. 12B. FIG. 12B also provides an example of torque ratios that are available utilizing the following gear tooth counts: 49 for sun gear member 422, 15 for planet gear member 427, 79 for ring gear member 424, 25 for each of the ring gear members 432, 442, 27 for each of the planet gears 437, 438 and 79 for ring gear member 444. Also, the ratio steps that are attained utilizing the sample of tooth numbers given may be calculated by dividing a forward ratio by another subsequent forward ratio. For example, the step ratio between first forward electrically variable mode 1.1 and the second electrically variable mode 1.2 is 1.620.

In the truth table of FIG. 12B, numerous forward and reverse states are grouped as "engine connected" states and may be so described due to the engagement of clutch 456. When clutch 456 is connected, power may flow from the engine 12 to the output shaft 19. FIG. 12B also shows "engine disconnected" states which are ratios achievable when the clutch 456 is disengaged, such that power does not flow from the engine 12 to the output shaft 19.

The truth table of FIG. 12B indicates that an identical reverse speed ratio of –3.160 may be achieved three different ways: via a fixed ratio, an electrically variable ratio (for given input speeds) or an engine disconnected "battery reverse" ratio.

The battery reverse ratio is achieved when clutch 456 is not engaged, so that engine 12 is disconnected, while clutch 452 is engaged, allowing Unit B 382 to power the output member 19 in reverse via planetary 440.

The Mode I EVT 1.1 driven thru a speed ratio of 2.926 (i.e., speed ratio of 2.926 is achieved at given input speeds for Unit A 480, Unit B 482 and engine 12) is achieved by engagement of the clutches 450 and 456. The EVT 1.1 speed ratio of 2.926 is an input-split ratio as torque from the input shaft 17 flows through the active planetary gear set 420. By engaging the clutch 454 to connect the Unit A to the planet carrier member 427 and thereby lock the planetary gear set 420, Units A and B and the engine 12 thereby drive the transmission through a low ratio provided at the combined planetary gear sets 430, 440. The electrically variable forward ratio EVT 1.2 is achieved by engaging the clutches 450, 456 when the speed of Unit A is zero at which point the engine to output speed ratio is 1.806. At this point, providing a brake (not included in diagram) to Unit A would allow a synchronous shift to a fixed ratio of 1.806. The ratio labeled shift Mode I-Mode II is a shift point when both the clutch 450 and the clutch 459 are engaged. At this point, the carrier member 449 speed is equal to the engine speed, allowing synchronous shifting. If both clutches are engaged, a fixed ratio is achieved at this point, however, if clutch 450 is disengaged, and 459 engaged, Mode II electrically variable mode is achieved. Further increasing output speed, reduces the speed of Unit A in Mode II after shift.

The Mode II EVT 2.1 is achieved with the engagement of the clutches 459 and 456 when the speed of Unit A equals zero and results in a transmission speed ratio of the engine 12 to the output member 19 of 1.244. Again, if a brake is added to Unit A with this schematic, synchronous engagement of that brake would result in a fixed ratio. It must be made clear that these points are speed ratios of the engine to output, however, output torque is dependent on the torque of the engine, Unit A and Unit B. With the engagement of the clutch 454 in addition to the clutches 459 and 456, a fixed direct ratio of 1.00 (referred to as Fixed F2) can be achieved if desired. The planetary gear set 420 is locked as the speed of Unit A is provided at both the sun gear member 422 and the carrier member 429. Engine speed is effectively provided at both the ring gear member 442 and the carrier member 449. Accordingly, the engine to output speed ratio achieved is 1.00. With the engagement of only the clutches 459 and 456 when the speed of Unit B equals zero, the electrically variable Mode II speed ratio EVT 2.2 of 0.76 is achieved.

As in the other conditions, addition of a brake to Unit B allows us to provide a fixed ratio of input to output. In the case of the schematic in FIG. 12A, engagement of the brake 458, a fixed F3 speed ratio of 0.76 is provided. The schematic then has the potential to be in either a fully electrically variable mode, or in up to six forward and two reverse fixed ranges. The logic or operational selection is based on operator requests, system states, and programmed logic to improve or optimize emissions, fuel economy, or performance.

Fifth Schematic Embodiment

Referring to FIG. 13A, a fifth preferred embodiment of a powertrain 510 having a transmission 514 is depicted. The transmission 514 utilizes three differential gear sets, preferably in the nature of planetary gear sets 520, 530 and 540. The planetary gear set 520 employs a ring gear member 524 which circumscribes a sun gear member 522. A planet carrier assembly member 526 includes a planet carrier 529 that rotatably supports a plurality of planet gears 527 such that each planet gear 527 meshingly engages both the ring gear member 524 and the sun gear member 522. The input member 17 is secured to the carrier member 529.

The planetary gear sets 530 and 540 are "compounded" to one another via continuously connected planet gears 537, 547 of each respective gear set. The planetary gear set 530 also has a sun gear member 532 meshingly engaged with each planet gear 537. The planetary gear set 540 also has a ring gear member 544 which circumscribes a sun gear member 542. The plurality of planet gears 547 are rotatably mounted on a carrier member 549 of a planet carrier assembly member 546 such that each simultaneously and meshingly engages both the ring gear member 544 and the sun gear member 542, and, is a common supporting device of both sets of pinions. This type of compounded planetary 530, 540 is known to those skilled in the art as a Ravigneaux gear set. The compounded gear set 530, 540 provides sufficient degrees of freedom to enable a synchronous shift from the forward Mode I brake 550 to the reverse MI R brake 552, as described below with respect to the truth table of FIG. 13B.

The transmission 514 also incorporates first and second motor/generators 580 and 582, respectively, which may be respectively referred to as Unit A and Unit B. The rotor of Unit A 580 is secured to the sun gear member 522. The rotor of Unit B 582 is secured to the sun gear member 542 via connecting member 571. The planetary gear set 520 is designed (via gear tooth numbers and connection of the engine 12 to the carrier member 529) so that connecting member 571 rotates in the same direction as the engine 12. The output member 19 is secured to the ring gear member 544. Park brake mechanism 590 is shown in a desired position relative to output member 19.

The first torque-transmitting mechanism, such as Mode I forward (MI F) brake 550 selectively connects the sun gear member 532 with the transmission housing 560. The second torque-transmitting mechanism such as the Mode I reverse (MI R) brake 552 selectively connects the pinion gear member 547 with the transmission housing 560. The third torque-transmitting mechanism such as disconnect clutch 556 selectively connects the second motor/generator 582 with the ring gear member 524. A fourth torque-transmitting mechanism such as a brake 558 selectively connects the ring gear member 524 with the transmission housing 560. Finally, a fifth torque-transmitting mechanism such as Mode II clutch 559 selectively connects the input member 17 with the carrier member 549. The torque-transmitting mechanisms 550, 552, 556, 558 and 559 are employed to assist in the selection of the operational states of the hybrid transmission 514, as will be hereinafter more fully explained.

It is apparent from FIG. 13A that the transmission 514 selectively receives power from the engine 12. The hybrid transmission 514 also receives power from an electrical power source 586, which is operably connected to a controller 588. The electric power source 586 may be one or more batteries. Other electric power sources, such as fuel cells, have the ability to provide, or store and dispense, electric power may be used in place of batteries without altering the concepts of the present invention. The ECU 588 is programmed to ensure that Unit B 582 rotates in a direction so that torque from Unit B 582 is added to torque from the engine at the connecting member 571.

As set forth above, the engagement schedule for the torque-transfer mechanisms is shown in the operating state table and fixed ratio mode table of FIG. 13B. FIG. 13B also provides an example of torque ratios that are available utilizing the following gear tooth counts: 49 for sun gear member 522, 15 for planet gear member 527, 79 for ring gear member 524, 25 for each of the ring gear members 532, 542, 27 for each of the planet gear members 537, 547 and 79 for ring gear member 544. Also, the ratio steps that are attained when the sample tooth numbers given are utilized may be calculated by dividing a forward ratio by another subsequent forward ratio. For example, the step ratio between first forward electrically variable range (Mode I EVT 1.1) and the second electrically variable range Mode I EVT 1.2 is 1.618.

In the truth table of FIG. 13B, numerous forward and reverse states are grouped as "engine connected" states and may be so described due to the engagement of clutch 556. When clutch 556 is connected, power may flow at least in part from the engine 12 to the output shaft 19. FIG. 13B also shows "engine disconnected" states which are ratios achievable when the clutch 556 is disengaged, such that power does not flow from the engine 12 to the output shaft 19.

The truth table of FIG. 13B indicates that the reverse speed ratio of −3.160 of planet carrier assembly member 546 may be utilized in three different ways: via a fixed ratio, an electrically variable ratio or an engine disconnected "battery reverse" ratio, as will be understood to those skilled in the art based on the description above with respect to FIG. 12B. The same is true in forward, in which a positive ratio of 3.19 of planet carrier assembly member 546 may be used in electrically variable, engine disconnected, or "battery forward" ratio. As in the earlier descriptions, some ratios shown in this chart represent the input to output speed ratio of the transmission, at conditions where unit speeds are zero, or, component speeds are equal, allowing the option for braking or clutching devices. These ratios also describe the clutching or motor events as the output speed increases.

Sixth Schematic Embodiment

Figure 14:
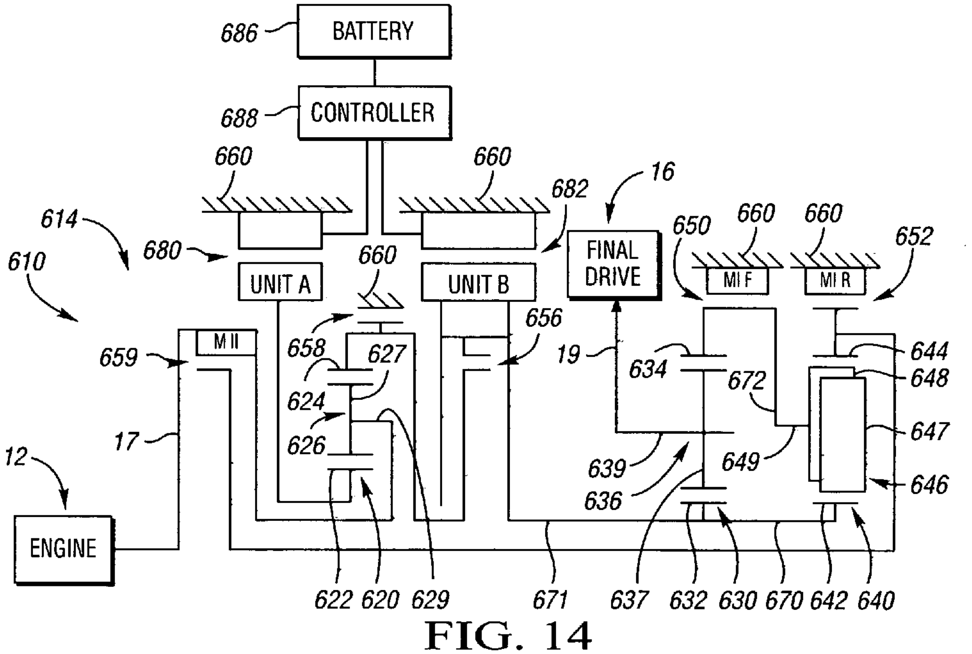
FIG. 14 is a schematic illustration of a sixth embodiment of a transmission, with the first planetary, Unit A, and Unit B constructed according to the nodal diagram of FIG. 1, and the forward/reverse/Mode II section constructed according to the alternative nodal diagram of FIG. 5, with K=1.

Referring to FIG. 14, a sixth preferred embodiment of a powertrain 610 having a transmission 614 is depicted. The transmission 614 utilizes three differential gear sets, preferably in the nature of planetary gear sets 620, 630 and 640. The planetary gear set 620 employs a ring gear member 624 which circumscribes a sun gear member 622. A carrier member 629 of a planet carrier assembly member 626 rotatably supports a plurality of planet gears 627 such that each planet gear 627 meshingly engages both the ring gear member 624 and the sun gear member 622. The input member 17 is secured to the carrier 629.

The planetary gear set 630 has a ring gear member 634 which circumscribes a sun gear member 632. Planet gears 637 rotatably supported on a carrier member 639 of a planet carrier assembly member 636 meshingly engage with the ring gear member 634 and the sun gear member 632.

The planetary gear set 640 also has a ring gear member 644 which circumscribes a sun gear member 642. The plurality of planet gears 647 are rotatably mounted on a carrier 649 such that each simultaneously and meshingly engages both the sun gear member 642 and a plurality of pinion gears 648. The pinion gears 648 meshingly engage the pinion gears 647 and the ring gear member 644.

The motor/generator 682 is secured to the sun gear member 632. An interconnecting member 670 continuously connects the sun gear member 632 with the sun gear member 642. An interconnecting member 672 continuously interconnects the ring gear member 634 with the carrier member 649.

The transmission 614 also incorporates first and second motor/generators 680 and 682, respectively. Motor/generators 680, 682 are also referred to as Unit A and Unit B and operate as described with respect to FIGS. 1 through 7 similarly to Unit A and Unit B 80, 82. Unit A 680 is secured to the sun gear member 622. Unit B 682 is secured to the sun gear member 632 via connecting member 671 and also to the sun gear member 642 via the interconnecting member 670. The planetary gear set 620 is designed (via gear tooth numbers and connection of the engine 12 to the planet carrier assembly member 626) so that connecting member 671 rotates in the same direction as the engine 12. The output member 19 is secured to the carrier 636.

The Mode I forward MI F brake 650 selectively connects the ring gear member 634 with the transmission housing 660. Disconnect clutch 656 selectively engages motor 682 with ring gear member 624. Brake 658 selectively connects the ring gear member 624 with the transmission housing 660. Mode II clutch 659 selectively connects the engine 12 with the ring gear member 644. The clutches and brakes 650, 652, 656, 658 659 are selectively engaged in like order as like numbered clutches shown in the truth tables of FIGS. 9B, 12B and 13B to provide various speed ratios, such as an equal input-split electrically variable forward and reverse.

For instance, an electrically variable reverse ratio (EVT Reverse) (for given input speeds) is achieved with the engagement of the MI R brake 652 and the clutch 656. This allows Unit B to power the sun gear member 642, the engine 12 provides power to the ring gear member 644 and the output ratio is provided at the carrier member 639.

Seventh Schematic Embodiment

Figure 15:
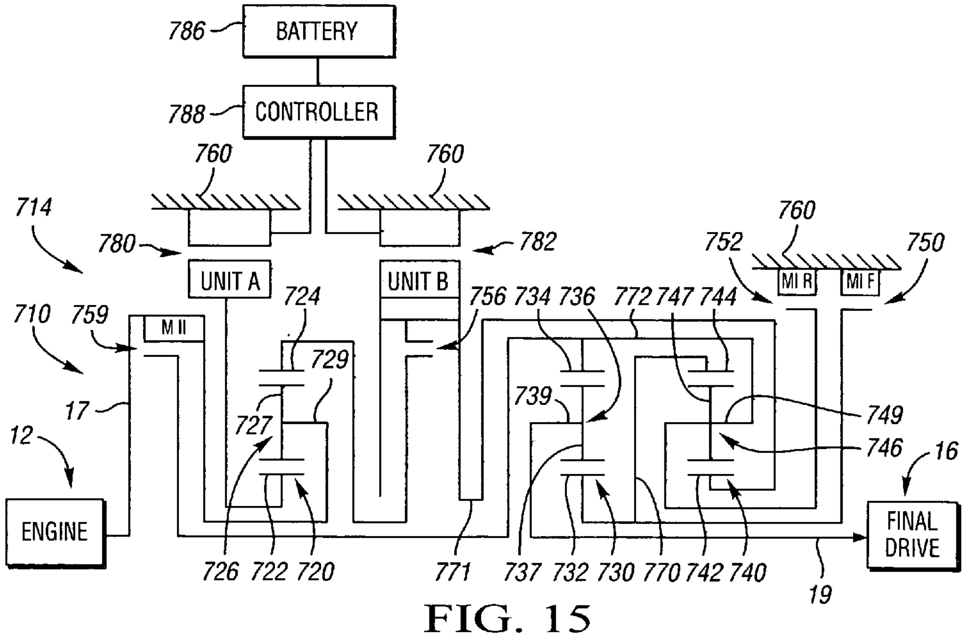
FIG. 15 is a schematic illustration of a seventh embodiment of a transmission, with the first planetary, Unit A, and Unit B constructed according to the nodal diagram of FIG. 1, and the forward/reverse/Mode II section constructed according to the alternative nodal diagram of FIG. 3.

Referring to FIG. 15, a seventh preferred embodiment of a powertrain 710 having a transmission 714 is depicted. The transmission 714 utilizes three differential gear sets, preferably in the nature of planetary gear sets 720, 730 and 740. The planetary gear set 720 employs a ring gear member 724 which circumscribes a sun gear member 722. A planet carrier assembly member 726 includes a carrier member 729 that rotatably supports the plurality of planet gears 727, such that each planet gear 727 meshingly engages both the ring gear member 724 and the sun gear member 722. The input member 17 is secured to the carrier member 729.

The planetary gear set 730 has a ring gear member 734 which circumscribes a sun gear member 732. A planet carrier assembly member 736 includes a carrier member 739. The plurality of planet gears 737 are rotatably mounted on the carrier member 739 of a planet carrier assembly member 736 such that each planet gear member 737 simultaneously and meshingly engages both the ring gear member 734 and the sun gear member 732.

The planetary gear set 740 also has a ring gear member 744 which circumscribes a sun gear member 742. A plurality of planet gears 747 are rotatably mounted on a carrier member 749 of planet carrier assembly member 746 such that each simultaneously and meshingly engages both the ring gear member 744 and the sun gear member 742.

An interconnecting member 770 continuously connects the sun gear member 732 and the ring gear member 744. Additionally, an interconnecting member 772 continuously interconnects the ring gear member 734 with the carrier member 749.

The transmission 714 also incorporates first and second motor/generators 780 (Unit A) and 782 (Unit B), respectively. The rotor of Unit A is secured to the sun gear 722. The rotor of Unit B is secured to the sun gear member 742 via connecting member 771. The planetary gear set 720 is designed (via gear tooth numbers and connection of the engine 12 to the carrier member 729) so that connecting member 771 rotates in the same direction as the engine 12. The output member 19 is secured to the carrier member 739.

A first torque-transmitting mechanism, such as forward Mode I brake MI F 750 is selectively engageable with the sun gear member 732. A second torque-transmitting mechanism such as reverse brake MI R 752 is selectively connectable to the carrier member 749 and thereby to the ring gear member 734 via the interconnecting member 772. A third torque-transmitting mechanism 756 such as a clutch selectively connects Unit B with the ring gear member 724. A fourth torque-transmitting mechanism, such as a clutch 759, selectively connects the engine 12 with the ring gear member 734 and thereby to the carrier member 749 via the interconnecting member 772. The clutch 759 is referred to as the Mode II clutch and establishes a second forward electrically variable drive mode.

It is apparent from FIG. 15 that the transmission 714 selectively receives power from the engine 12. The hybrid transmission 714 also receives power from an electrical power source 786, which is operably connected to a controller 788. The ECU 788 is programmed to ensure that Unit B 782 rotates in a direction so that torque from Unit B 782 is added to torque from the engine 12 at the connecting member 771. An optional torque-transmitting mechanism may be added to selectively connect Unit A to the carrier member 729 as a lock-up mechanism (to lock Unit A, Unit B and the engine 12 to one another for improved acceleration as described above with respect to the node diagram of FIG. 1 and the schematic embodiments of FIG. 9A (torque-transmitting mechanism 254). In each case, the functions are similar, as met in the block diagram combinations of FIGS. 1 through 6.

Eighth Schematic Embodiment

Figure 16:
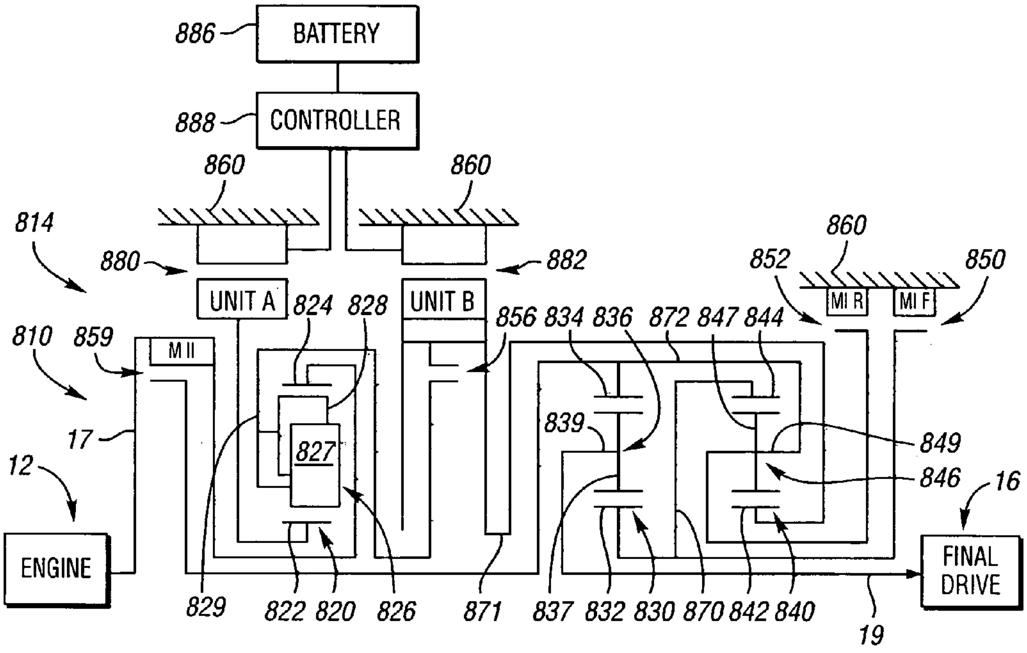
FIG. 16 is a schematic illustration of an eighth embodiment of a transmission, with the first planetary, Unit A, and Unit B constructed according to the nodal diagram of FIG. 1, and the forward/reverse/Mode II section constructed according to the alternative nodal diagram of FIG. 3.

Referring to FIG. 16, an eighth preferred embodiment of a powertrain 810 having a transmission 814 is depicted. The transmission 814 utilizes three differential gear sets, preferably in the nature of planetary gear sets 820, 830 and 840. The planetary gear set 820 employs a ring gear member 824 which circumscribes a sun gear member 822. A compounded planet carrier assembly member 826 includes a carrier member 829 that rotatably supports the plurality of planet gears 827 and 828 such that each planet gear 828 meshingly engages both the ring gear member 824 and planet gears 827. The planet gears 827 meshingly engage with both the planet gears 828 and the sun gear member 822. The input member 17 is secured to the ring gear member 824.

The planetary gear set 830 has a ring gear member 834 which circumscribes a sun gear member 832. The plurality of planet gears 837 are rotatably mounted on a carrier member 839 of planet carrier assembly member 836 such that each planet gear member 837 simultaneously and meshingly engages both the ring gear member 834 and the sun gear member 832.

The planetary gear set 840 also has a ring gear member 844 which circumscribes a sun gear member 842. A plurality of planet gears 847 are rotatably mounted on a carrier member 849 of planet carrier assembly member 846 such that each simultaneously and meshingly engages both the ring gear member 844 and the sun gear member 842.

An interconnecting member 870 continuously connects the sun gear member 832 with the ring gear member 844. Additionally, an interconnecting member 872 continuously interconnects the ring gear member 834 with the carrier member 849.

The transmission 814 also incorporates first and second motor/generators 880 (Unit A) and 882 (Unit B), respectively. The rotor of Unit A is secured to the sun gear member 822. The rotor of Unit B is secured to the sun gear member 842 via connecting member 871. The planetary gear set 820 is designed (via gear tooth numbers and connection of the engine 12 to the ring gear member 824) so that connecting member 871 rotates in the same direction as the engine 12. The output member 19 is secured to the carrier member 839.

A first torque-transmitting mechanism, such as forward Mode I brake MI F 850 is selectively engageable with the sun gear member 832 to ground the sun gear member 832 and the ring gear member 844 (via interconnecting member 870) to the transmission housing 860. A second torque-transmitting mechanism such as reverse brake MI R 852 selectively connects the carrier member 849 (and the ring gear member 834 via the interconnecting member 872) to the transmission housing 860. A third torque-transmitting mechanism such as a clutch 856 selectively connects the motor/generator 882 (Unit B) with the pinion gears 827, 828. A fourth torque-transmitting mechanism, such as a clutch 859, selectively connects the engine 12 with the ring gear member 834. The clutch 859 is referred to as the Mode II clutch and establishes a second forward electrically variable drive mode.

It is apparent from FIG. 16 that the transmission 814 selectively receives power from the engine 12. The hybrid transmission 814 also receives power from an electrical power source 886, which is operably connected to a controller 888. The electric power source 886 may be one or more batteries. Other electric power sources, such as fuel cells, have the ability to provide, or store and dispense, electric power may be used in place of batteries without altering the concepts of the present invention. The ECU 888 is programmed to ensure that Unit B 882 rotates in a direction so that torque from Unit B 882 is added to torque from the engine 12 at the connecting member 871. Optional torque-transmitting mechanisms may be added for engine start by Unit A, lockup mechanism (to lock Unit A, Unit B and the engine 12 to one another for improved acceleration) as described above with respect to the node diagram of FIG. 1 and the schematic embodiment of, for example, FIG. 9A.

Nodal diagrams represent the generalized connections available for this invention, and, the FIGS. 8, 9A, 11, 12A, 13A, 14, 15 and 16 are actual hardware implementation methods of those diagrams. The nodal diagrams, however, can have slight modifications such as moving clutches along junction lines. This is apparent to those who are knowledgeable in the field. One example is FIG. 11. This configuration corresponds directly to the nodal diagram of FIG. 2, except B1 is moved to the nodal connection between Unit B and node 30, and, the shown clutched node is grounded. The general diagram however does represent this embodiment, and those knowledgeable in the art will recognize these configuration options.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission comprising:

first and second motor/generators;

first, second and third differential gear sets, each having first, second and third members, said first and second motor/generators being continuously connected to respective ones of said differential gear sets and controllable to provide power thereto;

a plurality of torque-transmitting mechanisms;

an input member to receive power from a power source and being continuously connected to a member of one of said differential gear sets;

an output member continuously connected to another member of one of said differential gear sets; and said plurality of torque-transmitting mechanisms being selectively engageable to transfer power received by said input member from said power source through said differential gear sets to provide an input-split, electrically variable first mode having a forward and reverse range with respective equal forward and reverse speed ratios for given input speeds and to provide substantially equal fixed forward and fixed reverse speed ratios.

2. The electrically variable transmission of claim 1, wherein said torque-transmitting mechanisms are further selectively engageable to provide a compound-split, electrically variable second mode.

3. The electrically variable transmission of claim 1, wherein said torque-transmitting mechanisms are further selectively engageable to disconnect the power source from said output member; and to thereby provide substantially equal torque at said output member via power provided by said second motor/generator in an electric mode forward speed ratio and in an electric mode reverse speed ratio when the power source is so disconnected.

4. The electrically variable transmission of claim 1, wherein said electric forward and electric reverse speed ratios are provided via electrical power from said second motor/generator, said second motor/generator being connected to one of said second and third differential gear sets, there being no power provided by said first motor/generator or by the power source in said electric forward and electric mode reverse speed ratios.

5. The electrically variable transmission of claim 1, wherein said plurality of torque-transmitting mechanisms include a first brake and a second brake, said first brake and second brake being simultaneously selectively engageable to connect different respective members of said different gear sets with a transmission housing to thereby lock said output member such that it is characterized by a speed of zero, the transmission housing thereby providing reaction torque to reduce electrical loading when torque is applied to said output members at zero output speed.

6. The electrically variable transmission of claim 1, wherein said first gear set is interconnected between said input member and said second motor/generator such that a connecting member between said second motor/generator and one of said other gear sets rotates in a same direction as said input member so that torque provided from said power source is added to torque provided from said second motor/generator at said output member.

7. The electrically variable transmission of claim 1, wherein at least one of said torque-transmitting mechanisms is selectively engageable such that power provided by said first motor/generator is added to power provided by the power source and power provided by said second motor/generator, thus providing equal and sufficient launch power in either said electrically variable first mode forward or reverse range.

8. The electrically variable transmission of claim 1, wherein said third differential gear set is characterized by a torque load of substantially zero in said electrically variable first mode forward speed ratio; and wherein one of said plurality of torque-transmitting mechanisms is engaged synchronously with disengagement of another of said torque-transmitting mechanisms to apply torque load to said third differential gear set and shift from said electrically variable first mode to an electrically variable, compound-split second mode.

9. An electrically variable transmission comprising:

an input member to receive power from a power source;

an output member;

first and second motor/generators;

first, second and third differential gear sets each having first, second and third members;

said input member being continuously connected with a first member of said first differential gear set, and said output member being continuously connected with a member of one of said second or third differential gear sets;

said first motor/generator being continuously connected with a second member of said first differential gear set;

said second motor/generator being continuously connected with a first member of said third differential gear set;

at least one interconnecting member continuously interconnecting one of said members of said second differential gear set with one of said members of said third differential gear set; and a plurality of torque-transmitting mechanisms selectively engageable to provide substantially equal torque at said output member in an electrically variable forward speed ratio and in an electrically variable reverse speed ratio for a given input speed, and to provide substantially equal output torque in a fixed forward speed ratio and in a fixed reverse speed ratio.

10. The electrically variable transmission of claim 9, wherein said torque-transmitting mechanisms are further selectively engageable to disconnect the power source from said output member and to provide substantially equal torque at the output member in an electric forward speed ratio and an electric reverse speed ratio when the power source is so disconnected.

11. The electrically variable transmission of claim 10, wherein said electric forward and electric reverse speed ratios are provided via electrical power from said second motor/generator through at least one of said second and third differential gear sets.

12. The electrically variable transmission of claim 9, wherein said first motor/generator is operable for the starting the power source in either said electrically variable forward or electrically variable reverse speed ratio so that the power source provides power at said input member.

13. The electrically variable transmission of claim 9, wherein said first differential gear set is configured such that a direction of rotation of said input member is the same as a direction of rotation of a connecting member providing said continuous connection between said second motor/generator and said first member of said third gear set such that torque provided from the power source is added to torque provided from said second motor/generator at said output member.

14. The electrically variable transmission of claim 13, wherein at least one of said torque-transmitting mechanisms is selectively engageable such that torque provided from said first motor/generator is added to the torque from the power source and the torque provided from said second motor/generator, thus providing sufficient launch torque in said electrically variable forward speed ratio.

15. The electrically variable transmission of claim 9, wherein ones of said plurality of torque-transmitting mechanisms the selective engagement of which determines whether one of said forward speed ratios or one of said reverse speed ratios is provided are disposed between said second motor/generator and said output member.

16. The electrically variable transmission of claim 9, an energy storage device operable for supplying power to or receiving power from said first and second motor/generators;

a controller operable for controlling power transfer between said energy storage device and said first and second motor/generators; and wherein said controller causes said first motor/generator to transfer the power received by said input member from the power source to said energy storage device during shifts in selective engagement of said torque-transmitting mechanisms.

17. The electrically variable transmission of claim 9, wherein said electrically variable forward speed ratio is achieved in a first mode;

wherein said third differential gear set is characterized by a torque load of substantially zero in said electrically variable first mode forward speed ratio; and wherein one of said plurality of torque-transmitting mechanisms is engaged synchronously with disengagement of another of said torque-transmitting mechanisms to apply torque load to said third differential gear set and shift from said first mode to an electrically variable, compound-split second mode.

18. The electrically variable transmission of claim 9, wherein one of said torque-transmitting mechanisms is engaged synchronously with disengagement of another of said torque-transmitting mechanisms to shift between said electrically variable forward and said electrically variable reverse speed ratios when said output member is characterized by a speed of zero.

19. The electrically variable transmission of claim 18, wherein said second motor/generator is characterized by a speed of zero when said output member is characterized by a speed of zero, thereby causing said second and third differential gear sets to each be characterized by a speed of zero to reduce frictional spin losses during the shift between said respective electrically variable and fixed forward and reverse speed ratios.

20. The electrically variable transmission of claim 9, wherein said selective engagement of said plurality of torque-transmitting mechanisms provides two electrically variable forward modes, six fixed forward and two fixed reverse speed ratios.

* * * * *